United States Patent
Kwak et al.

(10) Patent No.: US 11,733,883 B2
(45) Date of Patent: *Aug. 22, 2023

(54) STORAGE DEVICE INITIATING MAINTENANCE OPERATION ACTIVELY WITHOUT INSTRUCTION OF HOST AND ELECTRONIC SYSTEM INCLUDING THE SAME

(71) Applicant: Samsung Electronics Co., Ltd., Suwon-si (KR)

(72) Inventors: Youngho Kwak, Seoul (KR); Hojun Shim, Yongin-si (KR); Kwanghee Choi, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/511,198

(22) Filed: Oct. 26, 2021

(65) Prior Publication Data

US 2022/0043587 A1 Feb. 10, 2022

Related U.S. Application Data

(63) Continuation of application No. 16/447,995, filed on Jun. 21, 2019, now Pat. No. 11,175,835.

(30) Foreign Application Priority Data

Aug. 3, 2018 (KR) .................... 10-2018-0090894

(51) Int. Cl.
*G06F 3/06* (2006.01)
*G06F 1/3206* (2019.01)
*G06F 13/10* (2006.01)

(52) U.S. Cl.
CPC .......... *G06F 3/0625* (2013.01); *G06F 1/3206* (2013.01); *G06F 3/0658* (2013.01);
(Continued)

(58) Field of Classification Search
CPC .... G06F 3/0625; G06F 3/0658; G06F 3/0679; G06F 1/3206; G06F 13/102; G06F 2213/0026
See application file for complete search history.

(56) References Cited

U.S. PATENT DOCUMENTS 6,967,891 B2  11/2005  Nishihara
8,843,700 B1   9/2014  Salessi et al.
(Continued)

FOREIGN PATENT DOCUMENTS

JP  5716473 B2   5/2015
JP  6018113 B2  11/2016
(Continued)

*Primary Examiner* — Nimesh G Patel
(74) *Attorney, Agent, or Firm* — Muir Patent Law, PLLC

(57) ABSTRACT

A storage device comprises a controller and a plurality of nonvolatile memory devices. Maintenance conditions of the nonvolatile memory devices are monitored internally by the storage device. Upon determining that a maintenance condition is satisfied, the storage device notifies an external host. The controller may perform the maintenance operations on the plurality of nonvolatile memory devices with little disruption to the host and assure data is reliably maintained by the nonvolatile memory devices.

20 Claims, 19 Drawing Sheets

(52) U.S. Cl.
CPC .......... *G06F 3/0679* (2013.01); *G06F 13/102* (2013.01); *G06F 2213/0026* (2013.01)

(56) References Cited

U.S. PATENT DOCUMENTS

| | | | |
|---|---|---|---|
| 9,277,077 | B2 | 3/2016 | Higashi |
| 9,304,577 | B2 | 4/2016 | Yan |
| 9,400,749 | B1* | 7/2016 | Kuzmin .............. G06F 12/0246 |
| 9,535,614 | B2 | 1/2017 | Reddy et al. |
| 9,542,118 | B1* | 1/2017 | Lercari ................. G06F 3/0616 |
| 9,720,616 | B2 | 8/2017 | Yu et al. |
| 9,817,591 | B2 | 11/2017 | Hwang |
| 10,324,661 | B2 | 6/2019 | Yoon et al. |
| 10,409,719 | B2 | 9/2019 | Tseng et al. |
| 10,552,058 | B1* | 2/2020 | Jadon .................... G06F 3/0647 |
| 10,672,451 | B2 | 6/2020 | Bang et al. |
| 2006/0020745 | A1* | 1/2006 | Conley .................. G06F 3/061 711/E12.008 |
| 2015/0364190 | A1 | 12/2015 | Aue |
| 2016/0155491 | A1 | 6/2016 | Roberts et al. |
| 2016/0231797 | A1 | 8/2016 | Meir et al. |
| 2017/0011002 | A1* | 1/2017 | Shin ...................... G06F 13/409 |
| 2017/0123726 | A1* | 5/2017 | Sinclair .................. G06F 12/02 |
| 2018/0059972 | A1 | 3/2018 | Alcantara et al. |
| 2018/0285007 | A1* | 10/2018 | Franklin ............. G06F 12/0246 |
| 2019/0235768 | A1* | 8/2019 | Helmick ............... G06F 3/0619 |

FOREIGN PATENT DOCUMENTS

| | | |
|---|---|---|
| JP | 2017-097638 A | 6/2017 |
| KR | 10-2016-0074827 A | 6/2016 |
| KR | 10-2016-0113580 A | 9/2016 |
| KR | 10-2017-0098958 A | 8/2017 |
| KR | 10-2017-0108788 A | 9/2017 |
| KR | 10-2018-0040769 A | 4/2018 |
| WO | 2016/126337 A3 | 10/2016 |

* cited by examiner

STORAGE DEVICE INITIATING MAINTENANCE OPERATION ACTIVELY WITHOUT INSTRUCTION OF HOST AND ELECTRONIC SYSTEM INCLUDING THE SAME

CROSS-REFERENCE TO RELATED APPLICATION

The present application is a continuation of U.S. application Ser. No. 16/447,995 filed Jun. 21, 2019 which claims priority under 35 U.S.C. § 119 to Korean Patent Application No. 10-2018-0090894 filed on Aug. 3, 2018 in Korean Intellectual Property Office, the disclosure of each of which being incorporated by reference herein in their entireties.

TECHNICAL FIELD

The present disclosure relates to an electronic device, and more particularly, relates to configurations and operations of a storage device for storing data.

DESCRIPTION OF RELATED ART

Nowadays, various types of electronic devices are being used. An electronic device performs its own functions according to operations of electronic circuits included in the electronic device. The electronic device may provide a service to a user while operating solely or while communicating with other electronic device.

A storage device is an example of electronic devices. The storage device is configured to store data in memory elements included in the storage device and to output the stored data. Accordingly, the storage device provides a storage service to the user.

With the growth of electronic devices and corresponding growth of electronic communications, various types of data have diversified and the amount of data to be stored has sharply increased. For this reason, the demand for a storage device to store a large amount of data reliably and to process a large amount of data at high performance rate has increased. For example, when data of a plurality of bits is stored in a semiconductor memory element on a small circuit area, it is advantageous to store a large amount of data. However, as charge leakage of the semiconductor memory element increases and a voltage margin for data determination decreases, data reliability may be degraded.

For example, the storage device may provide protection operations to prevent data reliability from being degraded. However, some storage devices are configured to operate passively under control of other electronic devices. The passive operation of the storage device may be insufficient to guarantee data reliability.

SUMMARY

A storage device may initiate and perform a maintenance operation of nonvolatile memory contained therein without requiring an instruction of a host.

Disclosed herein is a storage device and an electronic system including the storage device. According to some examples, the storage device comprises a controller and a plurality of nonvolatile memory devices. Maintenance conditions of the nonvolatile memory devices are monitored internally by the storage device. Upon determining that a maintenance condition is satisfied, the storage device notifies the host. The controller may perform the maintenance operations on the plurality of nonvolatile memory devices with little disruption to the host and assure data is reliably maintained by the nonvolatile memory devices.

According to some examples, the solid state storage device comprise an interface to provide communication with a host, a plurality of nonvolatile semiconductor memory devices, and a controller configured to be in communication with the nonvolatile memory devices to access the nonvolatile memory devices and configured to be in communication with the interface to receive commands from the host and communicate data with the host.

The solid state storage device may be operable in a normal mode in which the plurality of nonvolatile memory devices are turned on and receive power and the controller operates at a normal power consumption level, and may be operable in a power saving mode in which the plurality of nonvolatile memory devices are turned off and in which the controller operates at a reduced power consumption level less than the normal power consumption level.

The controller may comprise a timer, the timer being configured to be initiated upon the controller entering the power saving mode and being configured to determine the lapse of a reference time. The controller may be configured, in response to the timer determining a lapse of the reference time, to cause the storage device to send a notification to the host to cause the host to initiate exiting of the power saving mode of the solid state storage device.

In some examples, the controller is configured, in response to the timer, to initiate a read reclaim operation on one or more of the plurality of nonvolatile memory devices.

The solid state storage device may be connected to a power manager. In the normal mode of operation of the solid state storage device, the power manager may provide main power to the solid state storage device and the controller is configured to access the nonvolatile memory devices, to respond to commands received from the host and to transmit data between the host and the plurality of nonvolatile memory devices. In the power saving mode of operation of the solid state storage device, the power manager may provide the auxiliary power to the solid state storage device to operate only a portion of the solid state storage device and the plurality of semiconductor memory devices do not receive any power.

In the power saving mode of operation of the solid state storage device, the controller may be configured to send a notification to the host to cause the host to initiate an exit of the power saving mode of the solid state storage device, which may be an exit power saving mode command or causing the power manager to switch from supplying auxiliary power to supplying main power to the storage device.

In some examples, the controller comprises a status manager configured to cause a maintenance notification to be sent to the host in response to determining that one or more of the nonvolatile memory devices require maintenance to provide a period of time in which the solid state storage device may not be accessed by the host during which the controller may perform one or more maintenance operations on the one or more nonvolatile devices. The status manager may be configured to monitor an attribute of memory regions of the plurality of nonvolatile memory devices, such as one or more of, a wear level of each of the memory regions, an amount of invalid memory regions, an available capacity of the memory regions, lifespan of each of the memory regions, and reliability of data storage of each of the memory regions. The status manager may cause the maintenance notification to be sent to the host in response to a comparison of the monitored attribute to a threshold.

According to example embodiments, reliability, performance, and management efficiency of a storage device may be improved.

BRIEF DESCRIPTION OF THE DRAWINGS

The above and other objects and features of the present disclosure will become apparent from the following descriptions with reference to the accompanying figures.

DETAILED DESCRIPTION

Below, some example embodiments will be described in detail and clearly with reference to the accompanying drawings such that those skilled in the art can easily implement the present disclosure.

Figure 1:
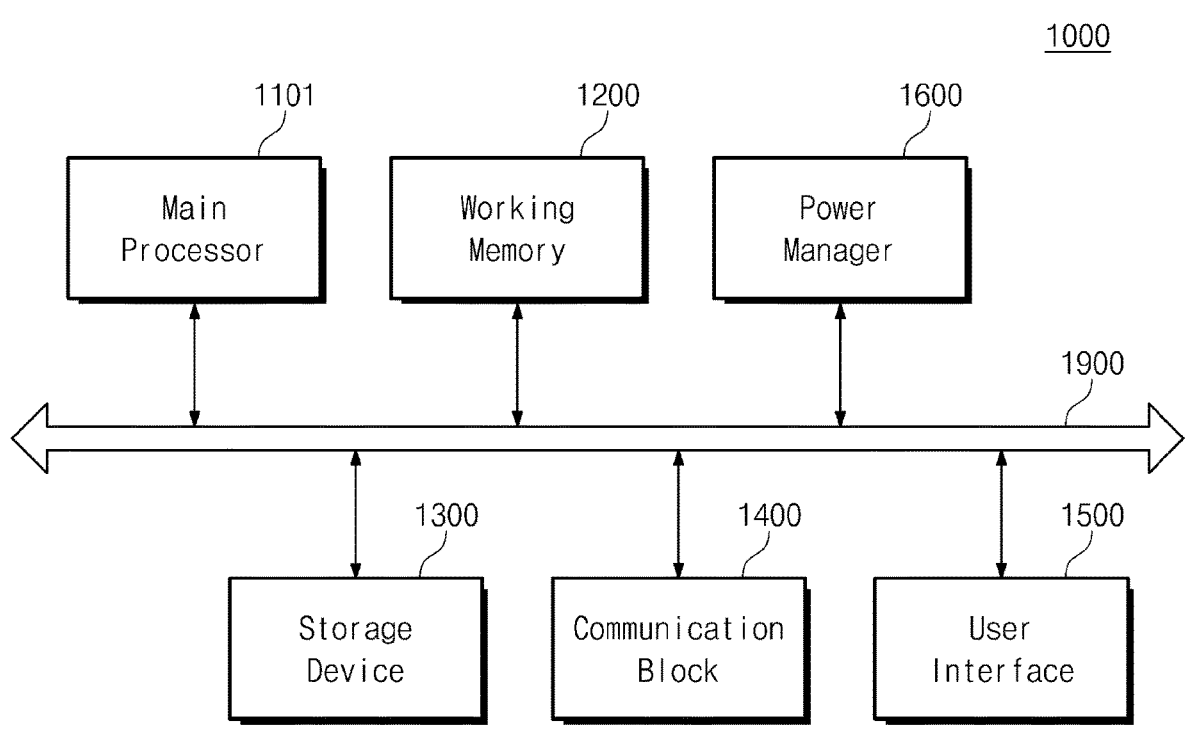
FIG. 1 is a block diagram illustrating an example configuration of an electronic system which includes a storage device according to some example embodiments.

FIG. 1 is a block diagram illustrating an example configuration of an electronic system 1000 which includes a storage device 1300 according to some example embodiments.

The electronic system 1000 may include a main processor 1101, a working memory 1200, the storage device 1300, a communication block 1400, a user interface 1500, a power manager 1600, and a bus 1900. For example, the electronic system 1000 may be a desktop computer, a laptop computer, a tablet computer, a smart phone, a wearable device, a video game console, a server, an electric vehicle, home appliances, and/or another type of electronic device.

The main processor 1101 may control overall operations of the electronic system 1000, and may perform various arithmetic/logical operations. For example, the main processor 1101 may be implemented by a general-purpose processor, a special-purpose processor, and/or an application processor. The main processor 101 may include one or more processor cores.

The working memory 1200 may store data which is used in an operation of the electronic system 1000. For example, the working memory 1200 may temporarily store data processed or to be processed by the main processor 1101. For example, the working memory 1200 may be volatile memory (that does not retain data when power is not supplied thereto) such as static random access memory (SRAM), dynamic RAM (DRAM), or synchronous DRAM (SDRAM), and/or a nonvolatile memory (which retains data when power is not supplied thereto) such as a phase-change RAM (PRAM), a magneto-resistive RAM (MRAM), a resistive RAM (ReRAM), or a ferroelectric RAM (FRAM).

The storage device 1300 may store data irrespective of whether power is supplied to the storage device 1300. For example, the storage device 1300 may be nonvolatile memory such as NAND or NOR flash memory, PRAM, MRAM, ReRAM, or FRAM. For example, the storage device 1300 may be a solid state storage device, such as a solid state drive (SSD), a memory card, or an embedded memory (each of which may be formed by and/or include nonvolatile memory cells formed as an integrated circuit within a semiconductor chip).

The communication block 1400 may support at least one of various wireless/wired communication protocols to communicate with an external device/system with respect to the electronic system 1000. The user interface 1500 may include various input/output interfaces to arbitrate communications between a user and the electronic system 1000.

The power manager 1600 may supply power to components of the electronic system 1000. The power manager 1600 may receive power from an external power source and/or a battery. The power manager 1600 may comprise a voltage supply to suitably convert the received external power (e.g., an external voltage) to a converted internal power (e.g., an internal voltage) for the components of the electronic system 1000.

The bus 1900 may provide a communication path between components of the electronic system 1000. The components of the electronic system 1000 may exchange data with one another in compliance with a bus format of the bus 1900. For example, the bus format may conform to one or more of various interface protocols such as universal serial bus (USB), small computer system interface (SCSI), peripheral component interconnect express (PCIe), mobile PCIe (M-PCIe), serial advanced technology attachment (SATA), serial attached SCSI (SAS), nonvolatile memory express (NVMe), universal flash storage (UFS), double data rate (DDR), low power DDR (LPDDR), etc.

The storage device 1300 may be implemented according to any of the example embodiments of the present disclosure. The storage device 1300 may initiate a maintenance operation independently without an instruction of a host (e.g., the main processor 1101). Example configurations and example operations associated with the storage device 1300 will be described with reference to FIGS. 2 to 20.

Exemplary details of storage device 1300 will be provided in the following descriptions, but the present invention is not limited thereto. The example embodiments may be employed in any type of device which includes a semiconductor memory element. The following descriptions are provided to facilitate better understanding, and are not intended to limit the present disclosure.

Figure 2:
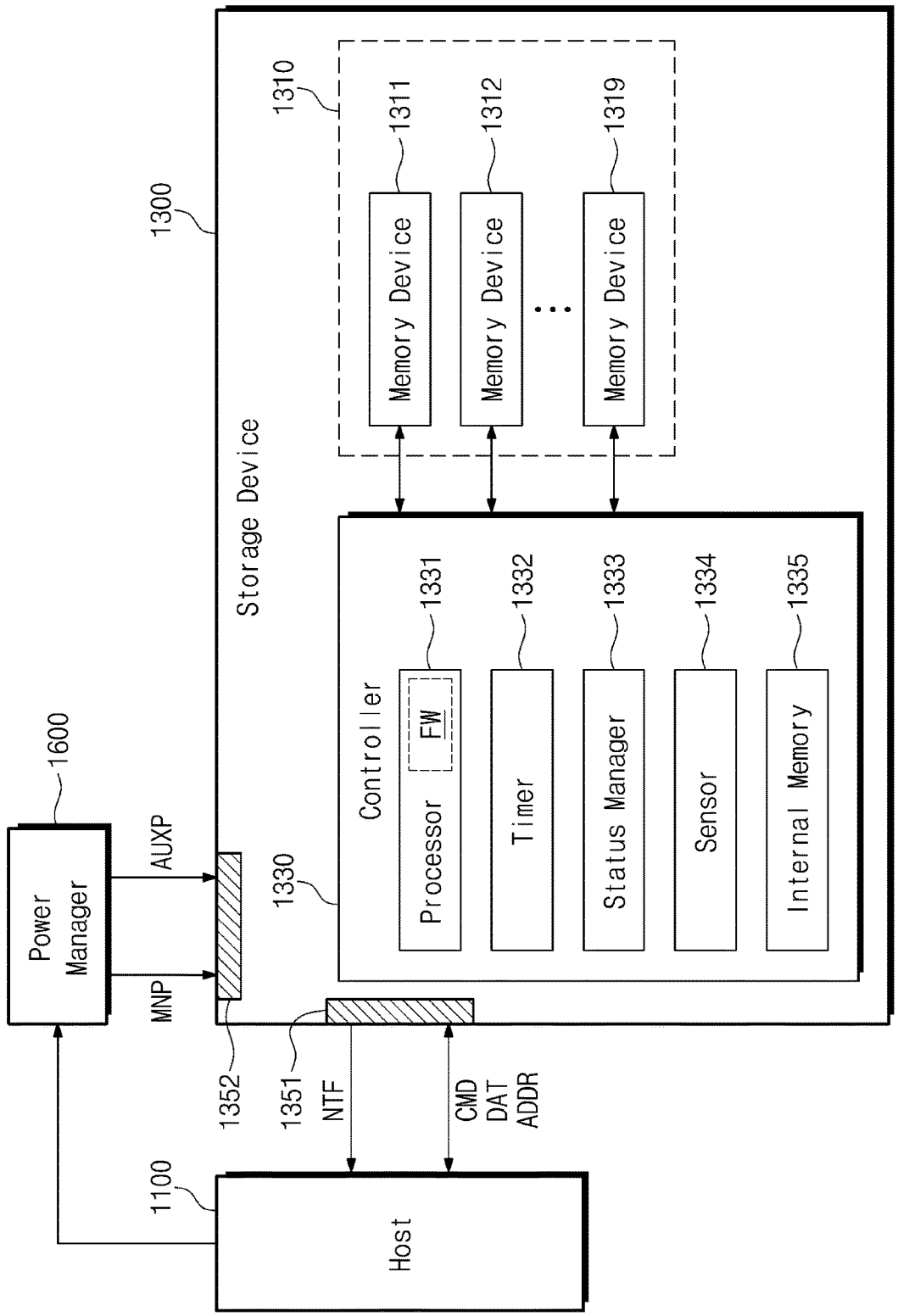
FIG. 2 is a block diagram illustrating an example configuration associated with a storage device of FIG. 1.

FIG. 2 is a block diagram illustrating an example configuration associated with the storage device 1300 of FIG. 1.

As described with reference to FIG. 1, the main processor 1101 may communicate with the storage device 1300 through the bus 1900. In the present disclosure, an external device capable of accessing the storage device 1300 may be referred to as a "host" (e.g., a host 1100). The main processor 1101 of FIG. 1 is an example of host 1100, but the present invention is not limited thereto.

The host 1100 may exchange data DAT with the storage device 1300. The storage device 1300 may provide a storage service to the host 1100 in response to a command CMD received from the host 1100. Signals, such as data DAT, commands CMD, and addresses ADDR, may be exchanged between host 1100 and storage device 1300 via signal interface 1351 of storage device 1300 and one or more signal lines (e.g., an external bus) extending between the host 1100 and storage device 1351. Signal interface 1351 may communicate with controller 1330 (e.g., via an internal bus of the storage device 1300) to exchange such signals.

For example, the host 1100 may provide the storage device 1300 with a write request (i.e., a write command CMD) and data DAT as write data. The storage device 1300 may store the requested write data in response to the write command. For example, the host 1100 may provide the storage device 1300 with a read request (a read command CMD). The storage device 1300 may output requested read data to the host 1100 in response to the read command. For example, the host may provide the storage device 1300 with a enter power saving mode command via signal interface 1351 to cause the storage device 1300 to enter the power saving mode described herein. In some examples, the enter power saving mode command may be a power off command. In some examples, the host 1100 may provide the storage device 1300 with an exit power saving mode command via signal interface 1351.

The storage device 1300 may include one or more memory devices 1310 and a controller 1330. Memory devices 1311, 1312, . . . 1319 may be separate devices, such as separate semiconductor memory chips or separate semiconductor packages each comprising a plurality of semiconductor memory chips. It will be appreciated that the number of memory devices included in the storage device 1300 may be variously changed or modified. The memory devices 1310 and controller 1330 may be mounted to a substrate (e.g., printed circuit board such as a system printed circuit board or a package substrate) and connected by a bus (e.g., formed on the substrate) to provide signal communications therebetween. The controller 1330 may be connected to signal interface 1351 via a bus on the substrate to communicate with host 1100. The substrate may also include wiring (and in some examples, switches) to connect a main voltage MNP (provided at power interface 1352) to the memory devices 1310 and the controller 1330 and to connect an auxiliary voltage (provided at power interface 1352) to a subset of the devices/circuits forming the storage device 1300 (as described herein). The memory devices 1310, controller 1330, the substrate and their interconnections may be formed and encased within a protective housing of the storage device 1300.

Each of the memory devices 1311, 1312 . . . 1319 may store or output data requested by the host 1100. To this end, each of the memory devices 1311, 1312 . . . 1319 may include memory regions for storing data. For example, each of the memory devices 1311, 1312 . . . 1319 may be or include a NAND-type flash memory semiconductor chip that may be implemented according to a V-NAND scheme (such as a Z-NAND scheme). For example, each of the memory devices 1311, 1312 . . . 1319 may be or comprise SLC (single level cell) NAND or MLC (multi-level cell) NAND. SLC NAND comprise single level cell (SLC) memory cells that each store only a single bit of data. MLC NAND comprise memory cells that each store two or more bits of data, such as a triple-level cell (TLC) NAND, or a quad-level cell (QLC) NAND. In some examples, MLC NAND may also comprise SLC memory cells that store only a single bit of data each.

The controller 1330 may control overall operations of the storage device 1300. For example, the controller 1330 may control the memory devices 1311, 1312 . . . 1319 such that data is stored in the memory devices 1311, 1312 . . . 1319 or is output from the memory devices 1311, 1312 . . . 1319. For example, the controller 1330 may perform a variety of data processing (e.g., compression/decompression, encryption/decryption, encoding/decoding, etc.) on data which is exchanged with the memory devices 1311, 1312 . . . 1319 (e.g., via wiring, such as a bus, between the controller and the memory devices 1311, 1312, . . . 1319). In some examples, the controller 1330 may be formed by a single semiconductor chip. In some examples, the controller 1330 may be formed by a plurality of interconnected devices (e.g., interconnected semiconductor chips).

The memory devices 1311, 1312 . . . 1319 and the controller 1330 may operate using power received from the power manager 1600 via power interface 1352. For example, the controller 1330 may operate such that different power modes are provided. The different power modes may provide different operation states with regard to power. Main voltage MNP and auxiliary voltage AUXP supplied to the storage device 1300 via power interface 1352 may be transmitted to controller 1330 and memory devices 1310 as described elsewhere herein. Signal interface 1351 and power interface 1352 may include terminals of the storage device 1300 (e.g., pins, solder bumps, pads, etc.) to provide connection to other external devices. Signal interface 1351 and power interface 1352 constitute an interface of the storage device 1300 (i.e., use of "interface" may generically refer to either or both of the signal interface 1351, power interface 1352, or portions thereof or other terminals of the storage device 1300—whether separately located, separately formed, etc.).

For example, a first mode may be a normal mode in which the memory devices 1311, 1312 . . . 1319 and the controller 1330 perform full operations while receiving full power. For example, a second mode may be a power saving mode in which the memory devices 1311, 1312 . . . 1319 and the controller 1330 stop certain operations fully or partially.

For example, when a storage service of the storage device 1300 is required, the memory devices 1311, 1312 . . . 1319 and the controller 1330 may operate while receiving power in the normal mode (e.g., the controller 1330 may control the memory devices 1311, 1312 . . . 1319 such that the memory devices 1311, 1312 . . . 1319 store or output data).

For example, when the storage device 1300 is idle (e.g., when the data DAT is not received or output) during a long time duration, it may be advantageous to reduce power consumption of the storage device 1300. In this case, the controller 1330 may control the storage device 1300 such that supply of power to the memory devices 1311, 1312 . . . 1319 is interrupted and components of the controller 1330 stop an operation fully or partially. Supply of power to components which stop the operation in the controller 1330 may also be interrupted.

Accordingly, power consumed by the memory devices 1311, 1312 . . . 1319 and the controller 1330 in the normal mode may be greater than power consumed by the memory devices 1311, 1312 . . . 1319 and the controller 1330 in the power saving mode.

Switching between the normal mode and the power saving mode may be provided under control of the host 1100 and/or the controller 1330. When the host 1100 and/or the controller 1330 determines that the data DAT has not been communicated for a long time (e.g., no communication of data DAT between storage device 1300 and any external device, such as host 1100, during a time period of a predetermined length), the operation state of the storage device 1300 may be switched from the normal mode to the power saving mode. When the host 1100 and/or the controller 1330 determines that communication of the data DAT is to be initiated, the operation state of the storage device 1300 may be switched from the power saving mode to the normal mode.

For example, to switch the operation state of the storage device 1300 from the normal mode to the power saving mode, the host 1100 may provide the storage device 1300 with a enter power saving mode command CMD via signal interface 1351 to cause the storage device 1300 to enter the power savings mode described herein. The controller 1330 of the storage device 1300 may receive the enter power saving mode command from the host 1100 and initiate the power saving mode of the storage device 1300 (which may include storing data in a volatile cache memory (not shown) of the storage device 1300 in the nonvolatile memory devices 1310 and/or copying data stored in volatile memory of the controller 1330 to the nonvolatile memory devices 1310, such as data of the status manager 1333 and internal memory 1335 as described herein. Such data may include metadata describing attributes of portions of the memory of memory devices 1310 and may include one or more of logic to physical address mapping tables, bad block addresses (identifying defective blocks of memory), defective word line addresses, defective bit line addresses, wear leveling information (e.g., erase count of each block of blocks of memory of the memory devices 1310), information identifying blocks of memory as free (available to be written to) or dirty (containing invalid data and ready to be erased), information identifying pages of data as valid or invalid, etc. The controller 1330 may turn off portions of the controller 1330, such as by providing internal instructions from the processor 1331 to other elements of the controller and/or by causing power to be switched off (i.e., by operating a switch, such as a transistor) to other elements of the controller. A synchronization circuit (not shown) of the controller 1330, such as a delay-locked loop (DLL) circuit(s) and/or phase-locked loop (PLL) circuit(s) of the controller 1330, may be turned off as part of the controller 1330 initiating the power saving mode of the storage device 1300. Such a synchronization circuit may provide timing (e.g., a clock) to the signal interface 1351 to provide timing of latching of input signals by an input buffer of the controller 1330 and/or timing of the output of signals by an output buffer of the controller 1330.

The operation state of the storage device 1300 may be switched from the power saving mode to the normal mode by the host 1100 providing a communication to the storage device 1300. For example, the host 1100 may cause the storage device 1300 to enter the normal mode by initiating the provision of the main voltage MNP, which in turn may cause the main voltage MNP to be supplied to the controller 1330 and memory devices 1310, turning on devices of the storage device 1300 that had been previously turned off, such as turning on portions of the controller 1330 that had been previously turned off, turning on the memory devices 1310 and turning on a cache memory (not shown) of the storage device 1300. In some examples, the host 1100 may cause the storage device 1300 to enter the normal mode by providing a signal to controller 1330 via signal interface 1351, causing the controller to switch power on to turn on devices of the storage device 1300 that had been previously turned off.

When the normal mode is required, the host 1100 may control the power manager 1600 such that the power manager 1600 provides a main voltage MNP to the storage device 1300. In the normal mode, the memory devices 1311, 1312 ... 1319 and the controller 1330 may operate receiving the main voltage MNP. On the other hand, when the power saving mode is required, supply of the main voltage MNP to the storage device 1300 may be interrupted (i.e., not supplied). The main voltage MNP may be the main power supply of the storage device 1300.

In some example embodiments, in the power saving mode, the host 1100 may control the power manager 1600 such that the power manager 1600 stops supply of the main voltage MNP to the storage device 1300 and provides an auxiliary voltage AUXP (e.g., an auxiliary power) to the storage device 1300. For example, when the controller 1330 stops certain operations of the storage device 1300 in the power saving mode, some components of the controller 1330 may continue to operate using the received auxiliary voltage AUXP. For example, all components of the controller (processor 1331, timer 1332, status manager 1333, sensor 1334, internal memory 1334) and all of the memory devices 1310 may have a power connection (e.g., by one or more wires) to the main voltage MNP supplied by the power manager 1600 so that in a normal mode, all of these devices receive the main voltage MNP. In contrast, only a subset of the components of the controller 1330 may have a power connection to the auxiliary voltage AUXP and other components of the controller 1330 and the memory devices 1310 do not have any connection to the auxiliary voltage AUXP. For example, in the power saving mode according to the embodiments described herein, the nonvolatile memory devices 1311, 1312, ... 1319 may not receive any power. For example, in the power saving mode, all memory semiconductor chips, such as those that may form memory devices 1310 and other semiconductor chips (e.g., volatile memory chips such as DRAM chips, SRAM chips, etc.) that may form cache memory (not shown) of the storage device 1300 may not be connected to any power source and thus are turned off. In addition, in the power saving mode one or more semiconductor chips of controller 1330 may either have DLL or PLL circuits formed therein turned off (e.g., in a sleep mode of that chip) or may not be connected to any power source. Thus, the power consumption level of the controller 1330 during the power saving mode may be reduced as compared to the normal power consumption level of the controller 1330 during the normal mode. In some examples, during the power saving mode, all DLL or PLL circuits of any semiconductor chip of the storage device 1300 is off. Thus, in the power saving mode according to some examples, when main voltage MNP is not supplied to the storage device 1300 and auxiliary voltage AUXP is supplied to the storage device 1300, only the subset of components of the controller 1330 may receive power. For example, this subset of components of the controller 1330 that receive auxiliary voltage AUXP may be timer 1332 and/or sensor 1334. In some examples, the controller 1330 and/or storage device 1330 may include an additional power manager (not shown) interposed between power manager 1600 to receive both the main voltage MNP and the auxiliary voltage AUXP distribute the same to the devices of the storage device 1300 based on whether the storage device is in a normal mode of operation or the power saving mode. In this implementation, this additional power manager may be connected to the auxiliary voltage AUXP and other components of the controller (e.g., timer 1332 and/or sensor 1334) may be selectively connected to the auxiliary power by this additional power manager (e.g., selectively connected to auxiliary power in the power saving mode). This additional power manager may act to detect an interruption of power supplied to the storage device 1300 (e.g., neither main voltage MNP nor auxiliary voltage AUXP are supplied) and act to avoid interruption of the components of the storage device 1300 that were being supplied with power (e.g., components that were supplied with either the main power or the auxiliary power at the time of the detected power interruption) by providing a backup power (e.g., from a battery, such as a capacitor) to those components. This additional power manager may also be configured to operate the storage device 1300 in other modes to reduce power consumption other than the power saving mode described herein. In some examples, power manager 1600 may be implemented as an element of the storage device 1300 (and operate in conjunction with the host 1100 and remaining elements of the storage device 1300 as described herein). In this example, an additional power manager located outside the storage device 1300 may not be necessary. Example operations based on the auxiliary voltage AUXP will be described below.

The auxiliary voltage AUXP may be separate from the main voltage MNP. In some examples, the auxiliary voltage AUXP may be separately supplied from the main voltage MNP (i.e., each of the auxiliary voltage AUXP and the main voltage MNP may be supplied to the storage device via separate dedicated power supply lines). Power supplied based on the auxiliary voltage AUXP may be smaller than power supplied based on the main voltage MNP. For example, a voltage level of the auxiliary voltage AUXP may be lower than a voltage level of the main voltage MNP. Alternatively, the voltage level of the auxiliary voltage AUXP may be identical to the voltage level of the main voltage MNP, but an amount of a current flowing based on the auxiliary voltage AUXP may be less than an amount of a current flowing based on the main voltage MNP. For example, the power supplied by the auxiliary voltage AUXP may be lower than the power supplied by the main voltage MNP. The auxiliary voltage AUXP may be suitable for the power saving mode.

The controller 1330 may include one or more hardware components (e.g., an analog circuit, a logic circuit, and/or the like) which are configured to perform operations described above and to be described below. In this example, the controller 1330 includes processor 1331, timer 1332, status manager 1333, sensor 1334, and internal memory 1335 (each of which may be formed as a circuit, hardware or firmware formed as an integrated circuit within one or more semiconductor chips).

However, a configuration of the controller 1330 is not limited to illustration of FIG. 2. The controller 1330 may not include one or more of the components illustrated in FIG. 2, and/or may further include a component which is not illustrated in FIG. 2.

In addition, FIG. 2 illustrates that the timer 1332, the status manager 1333, and the sensor 1334 are included in the controller 1330, but the present invention is not limited thereto. In some example embodiments, at least one of the timer 1332, the status manager 1333, and/or the sensor 1334 may be provided outside the controller 1330, or may be an independent component which is separate from the storage device 1300. The configuration of the controller 1330 of FIG. 2 is provided to facilitate better understanding, and is not intended to limit the present invention.

The processor 1331 may include one or more processor cores. Some of operations of the controller 1330 described above and to be described below may be implemented in a program code of firmware FW and/or software that configures the processor 1331, and the processor core(s) of the processor 1331 may execute an instruction set of the program code to provide intended operations. The processor 1331 may process various arithmetic/logical operations to execute the instruction set.

The timer 1332 may determine that a reference time has elapsed (the reference time may be referred to herein as a predetermined duration, predetermined time period, etc.). For example, the timer 1332 may include a hardware circuit (e.g., a timer circuit, a counter circuit, etc.) which is capable of measuring a time lapse. For example, the reference time for the timer 1332 may be set based on a control of the processor 1331 (according to execution of the firmware FW) and/or a control of other manner. The timer 1332 may be configured to output a signal when the timer 1332 determines that the reference time elapses or expires.

The status manager 1333 may collect and manage information of various statuses associated with an operation of the storage device 1300. For example, the status manager 1333 may collect and manage information of one or more circumstances (e.g., a temperature, a clock frequency, a bandwidth, etc.) in which the memory devices 1311, 1312 . . . 1319 and the controller 1330 operate. For example, the status manager 1333 may collect and manage information of attributes (e.g., a wear level, an amount of invalid memory regions (such as a percentage invalid memory regions of all, some or one of the memory devices 1311, 1312 . . . 1319, or a ratio of invalid to valid memory regions of all, some or one of the memory devices 1311, 1312 . . . 1319), an available capacity, etc.) of memory regions included in the memory devices 1311, 1312 . . . 1319. Invalid memory regions may comprise memory regions containing old data that is no longer valid (which may require erasure prior to writing according to some nonvolatile memory types, such as NAND flash memory). An available capacity of memory regions may denote a size of memory that is currently available for writing data. When the memory devices 1311, 1312 . . . 1319 are NAND flash memory chips, the memory regions may be blocks of memory each of which forms a minimal erasure unit in a NAND flash memory chip.

The status manager 1333 may include an independent hardware circuit which is capable of monitoring an operation of the storage device 1300 and storing the collected information. Alternatively, the status manager 1333 may be implemented as a portion of the firmware FW configuring the processor 1331 and thus may be executed by the processor 1331.

The sensor 1334 may sense various events which occur with regard to an operation of the storage device 1300. The sensor 1334 may include a hardware circuit which is configured to sense an event of an intended type. For example, when the sensor 1334 includes a temperature sensor for sensing a temperature at which the memory devices 1311, 1312 . . . 1319 and the controller 1330 operate, the sensor 1334 may include a hardware circuit (e.g., a bandgap reference (BGR) circuit) which is suitable for temperature sensing.

The internal memory 1335 may store data which is used in an operation of the controller 1330. For example, the internal memory 1335 may include a volatile memory such as an SRAM, a DRAM, or an SDRAM, and/or a nonvolatile memory such as a PRAM, an MRAM, a ReRAM, or an FRAM. For example, the internal memory 1335 may store information associated with the maintenance operation which is performed between the memory devices 1311, 1312 . . . 1319 and the controller 1330.

In example embodiments, the maintenance operation may include various operations for improving an operation circumstance and a characteristic of the storage device 1300. For example, when there is a risk that reliability of data stored in the memory devices 1311, 1312 . . . 1319 is to be degraded, the maintenance operation may be performed to improve and guarantee data reliability. However, the present invention is not limited thereto, and the maintenance operation may be variously changed or modified. To facilitate better understanding, some example maintenance operations will be described below.

The storage device 1300 may be a device which operates passively in accordance with a command and a request of the host 1100. However, when the maintenance operation is performed passively, it may be insufficient to improve the operation circumstance and the characteristic of the storage device 1300, and an error or a failure may occur in an operation of the storage device 1300.

In example embodiments, the storage device 1300 may initiate and/or perform the maintenance operation actively without an instruction or intervention of the host 1100. For example, as the controller 1330 communicates with at least one of the memory devices 1311, 1312 . . . 1319, the maintenance operation may be performed between the controller 1330 and the memory devices 1311, 1312 . . . 1319.

For example, even when the host 1100 fails to recognize the status associated with the operation of the storage device 1300 or the host 1100 is very busy to control the storage device 1300, the maintenance operation may be performed. Accordingly, even if the host 1100 does not intervene, reliability, performance, and management efficiency of the storage device 1300 may be improved.

In some examples, the storage device 1300 may output a notification NTF to the host 1100 to notify the host 1100 that the maintenance operation is to be performed. For example, the notification NTF may be output from the controller 1330, or may be output from a component included in the controller 1330 or from other component not included in the controller 1330. For example, the other component may directly output the notification NTF under control of the controller 1330 (e.g., in response to the timer 1332 when a predetermined duration has elapsed), or the controller 1330 may generate the notification NTF in a format to be transmitted to the host 1100 based on an output of other component. The notification NTF may form a wake up request that may request the host 1100 cause the initiation of exiting the storage device 1300 from the power saving mode.

An interface protocol may be employed for communication between the host 1100 and the controller 1330. In some example embodiments, the notification NTF may be output using a specific signal or through a specific pin defined in the interface protocol, or may be output through a channel for exchanging the data DAT. In some example embodiments, the notification NTF may be output according to a separate communication not corresponding to the interface protocol that may otherwise be implemented.

However, the above examples are provided to facilitate better understanding, and are not intended to limit the present disclosure. The notification NTF may be variously changed or modified to perform suitable processing with regard to performing the maintenance operation.

Figure 3:
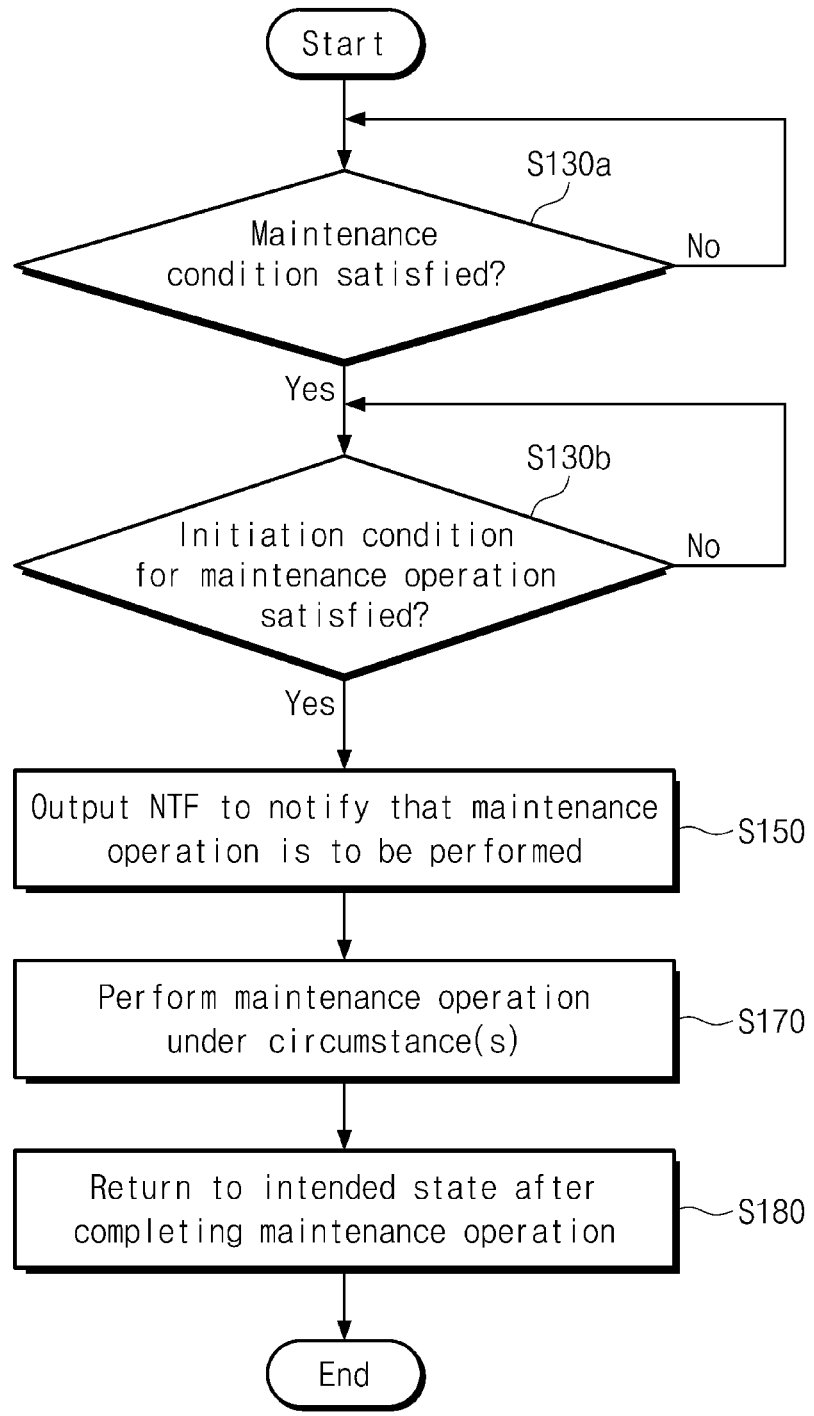
FIG. 3 is a flowchart describing an example operation of a storage device of FIG. 2.

FIG. 3 is a flowchart describing an example operation of the storage device 1300 of FIG. 2.

In some examples, the method of FIG. 3 may be initiated as part of the storage device 1300 entering the power saving mode in which operations of the controller 1330 and memory devices 1311, 1312 . . . 1319 are partially or fully stopped. In other examples, the method of FIG. 3 may be initiated periodically at regularly spaced intervals, such as upon an initial startup operation of the controller 1330 and repeated upon each completion of the method of FIG. 3. The controller 1330 may manage a maintenance condition (S130*a*). The maintenance condition may be associated with whether the maintenance operation is required. When the maintenance condition is not yet satisfied (No of S130*a*), the controller 1330 may continue to monitor whether the maintenance condition is satisfied. The controller 1330 may monitor the maintenance condition actively by using the timer 1332, the status manager 1333, and the like, without intervention of the host 1100.

For example, the controller 1330 may monitor a status associated with the memory devices 1311, 1312 . . . 1319 via status monitor 1333. The controller 1330 may manage whether the monitored status satisfies the maintenance condition. For example, the status monitored by the status monitor 1333 of controller 1330 may be associated with various attributes such as a lifespan of each of the memory devices 1311, 1312 . . . 1319, reliability of data stored in each of the memory devices 1311, 1312 . . . 1319, an available capacity of the memory devices 1311, 1312 . . . 1319, etc.

When the maintenance condition is satisfied (Yes of S130*a*), this may mean that it is required to improve the operation circumstance and the characteristic of the storage device 1300 by performing the maintenance operation in the storage device 1300. The storage device 1300 may intend to initiate the maintenance operation to improve the operation circumstance and the characteristic of the storage device 1300.

For example, when a numerical value of the monitored status reaches a reference value, the controller 1330 may determine that the monitored status satisfies the maintenance condition. For example, the controller 1330 may monitor the available capacity of the memory devices 1311, 1312 . . . 1319. When the available capacity of the memory devices 1311, 1312 . . . 1319 becomes smaller than the reference value, the controller 1330 may determine that the maintenance condition for increasing the available capacity is satisfied.

In some example embodiments, the controller 1330 may manage an initiation condition (S130*b*). The initiation condition may be associated with whether to initiate the maintenance operation.

When the initiation condition is not yet satisfied (No of S130*b*), the controller 1330 may not initiate the maintenance operation until the initiation condition is satisfied. The maintenance operation may be initiated and performed in response to the initiation condition being satisfied (Yes of S130*b*) after the monitored status satisfies the maintenance condition (Yes of S130*a*). In some examples, step S130*b* may be omitted and an initiation condition need not be satisfied for the method to proceed to step S150.

For example, while the storage device 1300 provides a storage service to store and output data, performing the maintenance operation may be a burden on the storage device 1300. Accordingly, for example, the initiation condition may be associated with whether system resources are available for the memory devices 1311, 1312 . . . 1319 and the controller 1330 to perform the maintenance operation. In some examples, the maintenance operation may be more important than the storage service, and the initiation condition may be determining that the priority of the maintenance operation is higher than those previously occupying available system resources.

For example, when a reference time passes after entering the power saving mode (i.e., after the memory devices 1311, 1312 . . . 1319 and the controller 1330 have stopped an operation (fully or partially)) or when it is determined that the storage device 1300 is not currently being used (e.g., used in access operations to exchange data with a host), the controller 1330 may determine that the memory devices 1311, 1312 . . . 1319 and the controller 1330 have availability to perform the maintenance operation.

After the maintenance condition is satisfied, in response to the initiation condition being satisfied, the storage device 1300 may output the notification NTF to the host 1100 to notify host 1100 that the maintenance operation is to be performed (S150). In response to the maintenance condition and the initiation condition being satisfied, the maintenance operation may be initiated and performed on the memory devices 1311, 1312 . . . 1319 by the controller 1330 (S170).

In some cases, a circumstance which is suitable to perform the maintenance operation may be absent. For example, when the main voltage MNP is not received, the storage device 1300 may be unable to perform the maintenance operation. For example, data to be referenced in the maintenance operation may be only available from an external source, such as from the host 1100. In these cases, the storage device 1300 may require the main voltage MNP and/or the reference data of the host 1100 to perform the maintenance operation.

In some example embodiments, the host 1100 may set a circumstance, in which the maintenance operation is to be performed, in response to the notification NTF. For example, in response to the notification NTF, the host 1100 may control the power manager 1600 such that the main voltage MNP is provided to the storage device 1300, and/or may provide the storage device 1300 with the data to be referenced in the maintenance operation. As such, the circumstance suitable for the maintenance operation may be provided under the control of the host 1100 in response to the notification NTF.

For example, a first circumstance may be suitable for the maintenance operation, but the controller 1330 may be in a second circumstance different from the first circumstance. While the controller 1330 is in the second circumstance, the controller 1330 may determine that the monitored status satisfies the maintenance condition (and the initiation condition) for performing the maintenance operation. Afterwards, based on the notification NTF, the second circumstance may be changed to the first circumstance under control of the host 1100. Accordingly, the first circumstance suitable for the maintenance operation may be provided.

In the provided circumstance (e.g., the first circumstance), the controller 1330 may communicate with at least one of the memory devices 1311, 1312 . . . 1319 such that the maintenance operation associated with the monitored status is performed. Accordingly, the maintenance operation may be performed in the first circumstance, and the first circumstance may be set under control of the host 1100.

The maintenance operation may be performed without intervention of or control by the host 1100 (except for providing the suitable circumstance based on the notification NTF if needed). The storage device 1300 may determine the maintenance condition and may initiate and perform the maintenance operation by itself without intervention, instructions, commands, control, etc. by the host 1100. The host 1100 may just provide the circumstance suitable for the maintenance operation. Accordingly, resources of the host 1100 to perform the maintenance operation may be minimized.

After the maintenance operation is completed, the operation states of the memory devices 1311, 1312 . . . 1319 and the controller 1330 may return to operation states before the maintenance operation is performed (S180). For example, when the memory devices 1311, 1312 . . . 1319 and the controller 1330 have entered the normal mode from the power saving mode to perform the maintenance operation, the memory devices 1311, 1312 . . . 1319 and the controller 1330 may return to the power saving mode after the maintenance operation is completed.

For example, when the controller 1330 has suspended monitoring of the status associated with the memory devices 1311, 1312 . . . 1319 to perform the maintenance operation, the controller 1330 may resume the monitoring after the maintenance operation is completed. As such, after the maintenance operation is completed, the first circumstance suitable for the maintenance operation may be changed to the second circumstance different from the first circumstance.

The monitored status may be changed as the maintenance operation is performed. For example, when the maintenance operation for increasing an available capacity is performed, the available capacity after the maintenance operation is completed may increase compared with an available capacity before the maintenance operation is performed.

As such, a monitored status before the maintenance operation is performed may be different from a monitored status after the maintenance operation is completed. The maintenance operation may be performed to change (e.g., improve) the status associated with the memory devices 1311, 1312 . . . 1319.

It has been described that the initiation condition is separate from the maintenance condition. However, some example embodiments may be implemented such that a separate initiation condition need not be monitored and/or satisfied. In such example embodiments, when the monitored status satisfies the maintenance condition in step S130*b*, the storage device 1300 may output the notification NTF and may perform the maintenance operation.

In addition, it may be readily understood that the monitored status, the maintenance condition, and the initiation condition described above are only some of possible examples and may be variously changed or modified without being limited to the above examples. To facilitate better understanding, some example embodiments will be described with reference to FIGS. 4 to 15.

Figure 4:
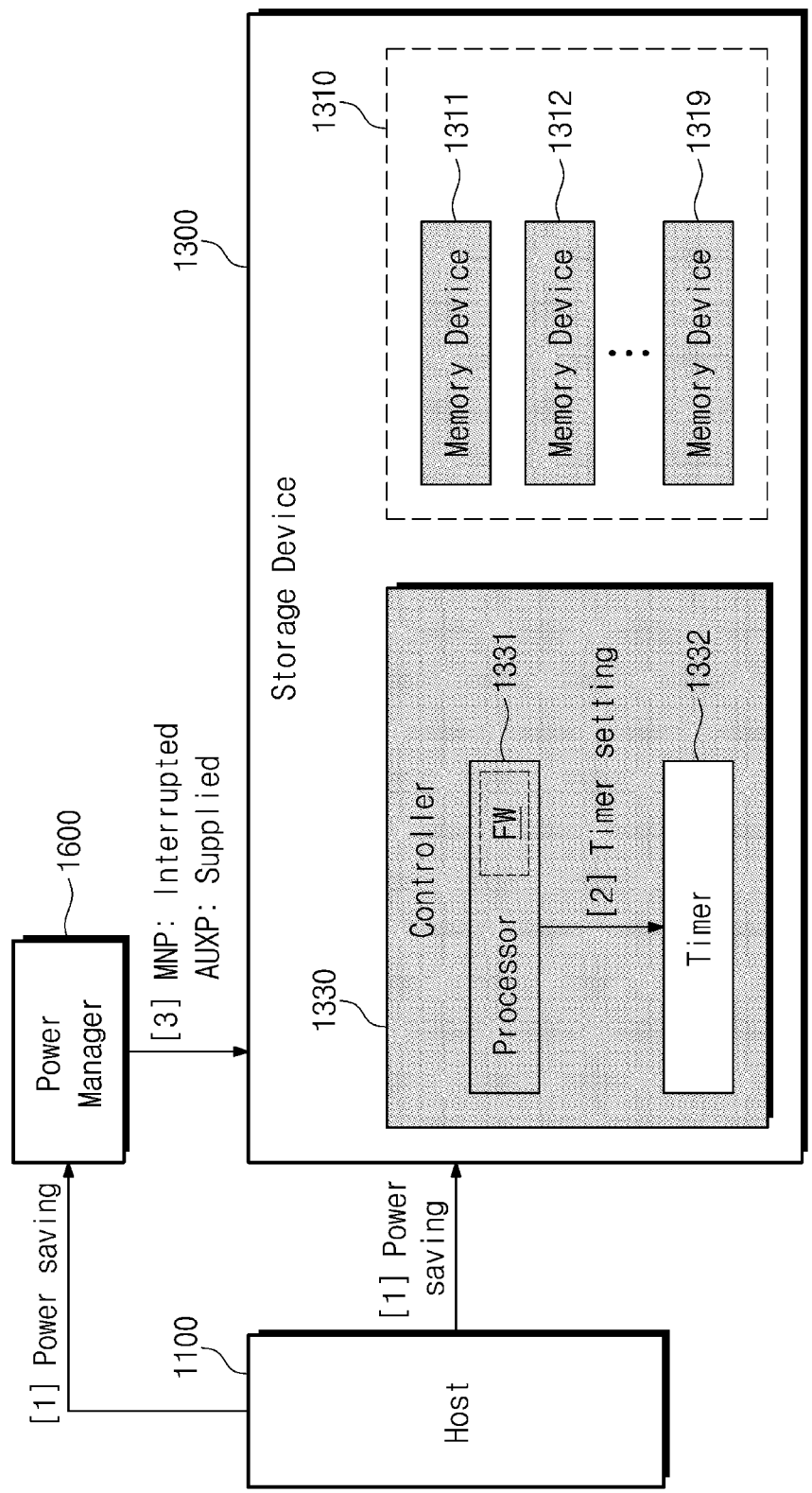
FIGS. 4 to 6 are conceptual diagrams for describing an example operation of a storage device of FIG. 2 according to some example embodiments.
Figure 5:
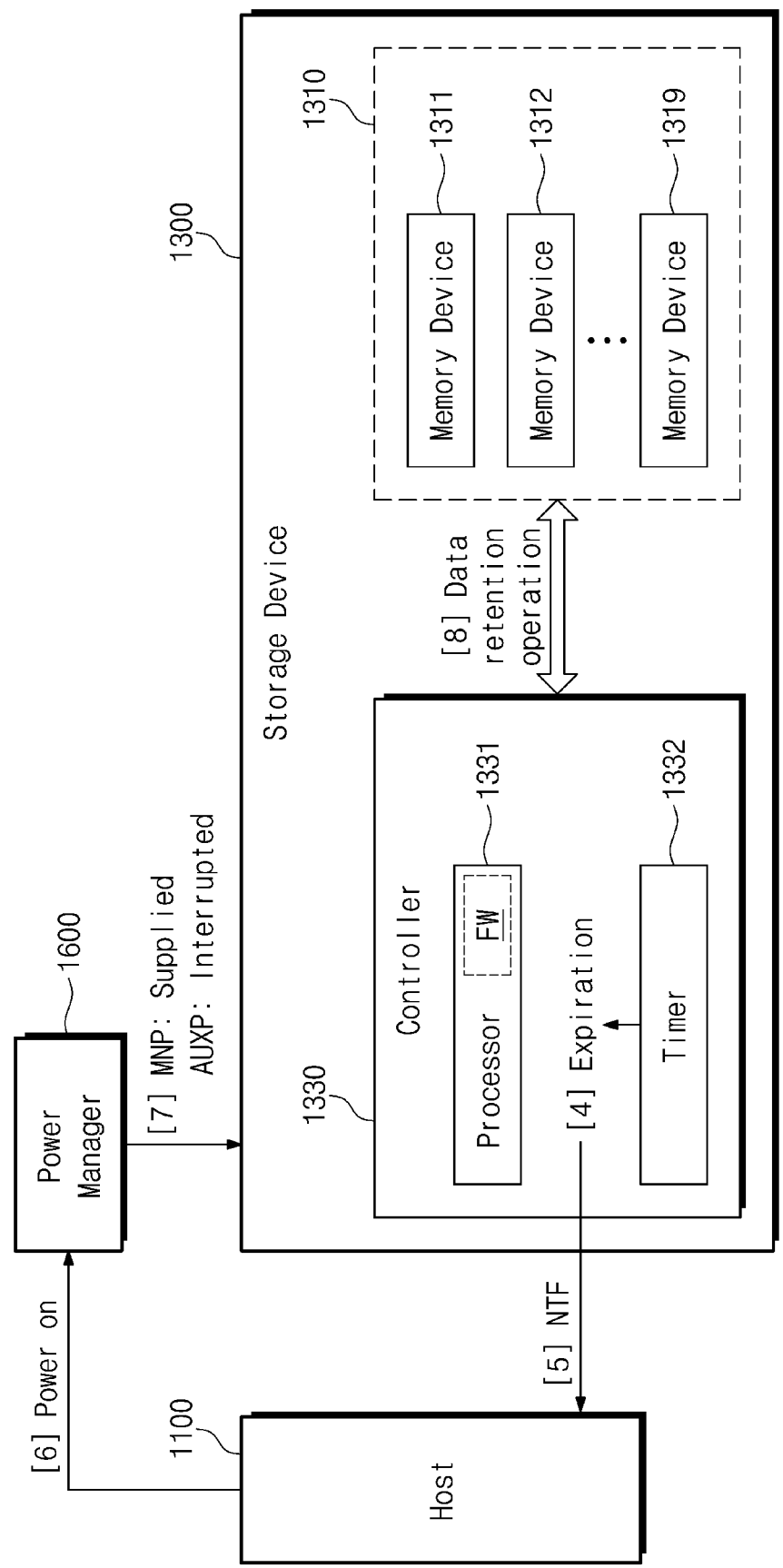
Figure 6:
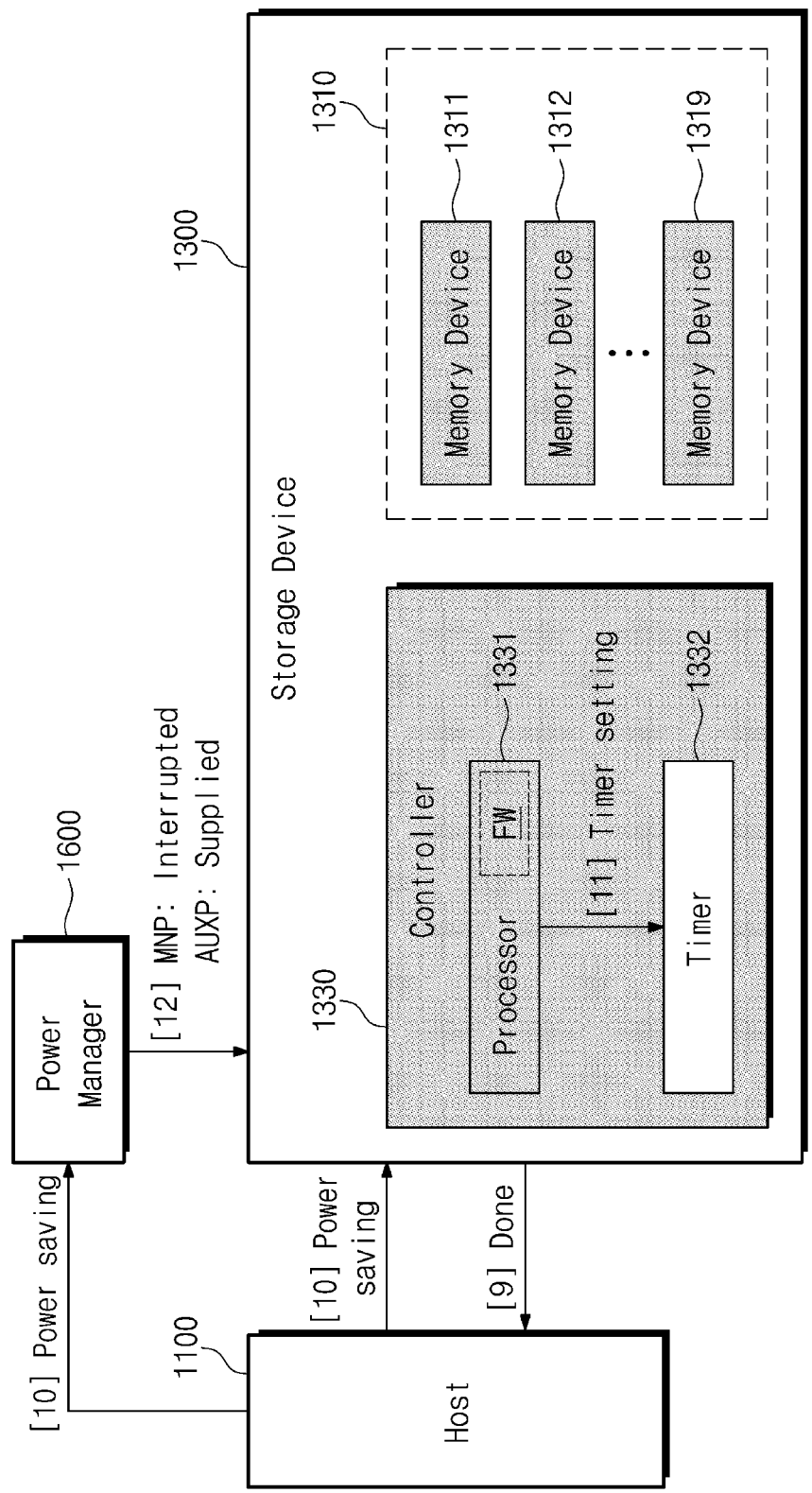
Figure 7:
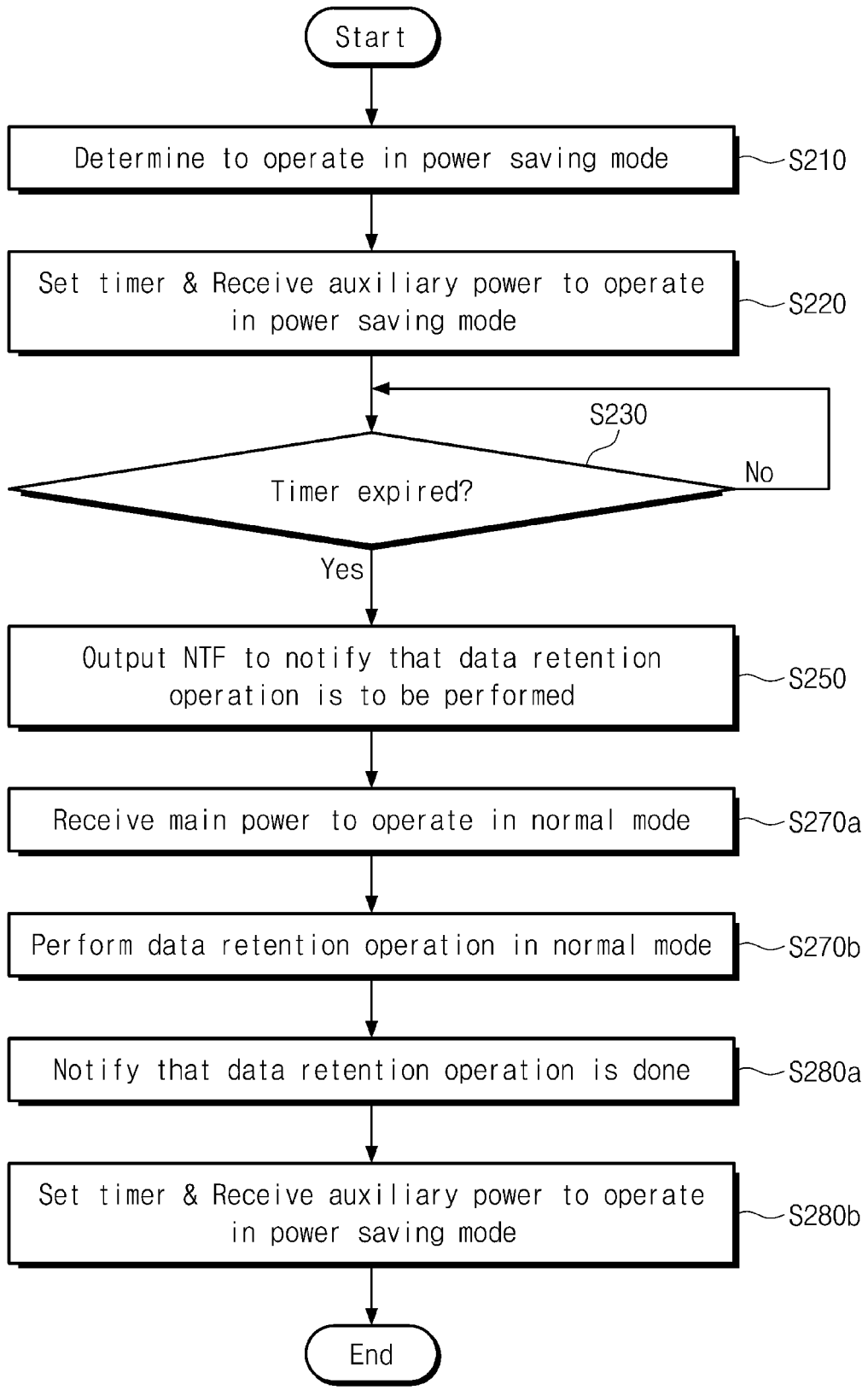
FIG. 7 is a flowchart describing an example operation of FIGS. 4 to 6.

FIGS. 4 to 6 are conceptual diagrams for describing an example operation of the storage device 1300 of FIG. 2 according to some example embodiments. FIG. 7 is a flowchart describing an example operation of FIGS. 4 to 6. For ease of explanation, only a single power supply line from power manager 1600 t storage device 1300 is shown, but several power supply lines may be used (such as shown in FIG. 2). In describing the example operations of the storage device 1300, greyed-out portions of the figures in this disclosure indicate elements of the storage device 1300 that are off (e.g., shutdown and/or not receiving any power) with respect to these example operations.

Referring to FIG. 4, the host 1100 and/or the controller 1330 may determine that the storage device 1300 should enter the power saving mode (S210 of FIG. 7). Under control of the host 1100 and/or the controller 1330, the operation state of the storage device 1300 may be switched from the normal mode to the power saving mode (operation [1] of FIG. 4).

In response to the switching from the normal mode to the power saving mode, the controller 1330 (e.g., according to execution of the firmware FW, the processor 1331) may set the reference time for the timer 1332 (operation [2] of FIG. 4, S220 of FIG. 7) and initiate operation of the timer 1332. Upon its initiation, the timer 1332 may start to measure lapsed time after its initiation and determine the expiration of the reference time after the timer 1332 initiation without intervention of the host 1100.

For example, the memory devices 1311, 1312 . . . 1319 may be flash memory semiconductor chips. When a memory cell of the flash memory is left without power being supplied for a long time, data of the memory cell may be lost due to charge leakage from a charge storage element of the memory cell (which may cause degradation of data reliability). As NAND flash memory cells are configured to store larger number of bits, a voltage margin for data determination may become smaller. Accordingly, a memory cell storing a plurality of bits may be more vulnerable to charge leakage causing erroneous data determination of bits stored therein.

For example, the reference time of the timer 1332 may be selected taking into account a time length which may guarantee data reliability of the memory cell while power is not supplied. The reference time may be set to perform the maintenance operation for guaranteeing data reliability (hereinafter referred to as a data retention operation) before the data is lost.

The reference time may be selected to be fixed or variable by a designer, a manufacturer, and/or a user. For example, the controller 1330 may comprise a programmable register (not shown) that may be programmed to store a reference time received from an external source. The programmable register may comprise a non-volatile register, that may be programmed by the host 1100 in response to a program command from the host 1100 to the controller 1330. For example, the programmable register may comprise a fuse or anti-fuse set that may be programmed during manufacturing (e.g., with a laser). For example, the reference time may be adjustable by the controller 1330 depending on a reliability status (e.g., a wear level, data reliability, lifespan, etc.) of the memory devices 1311, 1312 . . . 1319 as determined by the status manager 1333.

The controller 1330 may monitor the status associated with the memory devices 1311, 1312 . . . 1319 by using the timer 1332. For example, the monitored status may include a time duration in which data stored in the memory devices 1311, 1312 . . . 1319 is retained without power being received by the memory devices 1311, 1312 . . . 1319.

Meanwhile, in response to the switching from the normal mode to the power saving mode, the memory devices 1311, 1312 . . . 1319 and the controller 1330 may stop an operation fully or partially (illustrated by shading). However, in the power saving mode, the timer 1332 may still operate to determine the time lapse has reached the reference time. The supply of the main voltage MNP may be interrupted, but the auxiliary voltage AUXP may be received to operate the timer 1332 (operation [3] of FIG. 4, S220 of FIG. 7).

When the reference time as determined by the timer 1332 does not elapse or expire (No of S230 of FIG. 7), the timer 1332 may continue to monitor the reference time. On the other hand, referring to FIG. 5, when the reference time monitored by the timer 1332 elapses or expires (Yes of S230 of FIG. 7), the timer 1332 may output a signal indicating the lapse or expiration of the reference time (operation [4] of FIG. 5).

The storage device 1300 may output the notification NTF to the host 1100 based on the signal output from the timer 1332 (i.e., based on the lapse or expiration of the reference time) (operation [5] of FIG. 5, S250 of FIG. 7). The notification NTF may be output to notify that there is a risk that data is to be lost and thus the data retention operation is to be performed. The notification NTF may be a request to the host 1100 to initiate exiting of the power saving mode of the storage device 1300 (e.g., a request to wake up the storage device 1300).

In this example, it may be understood that the maintenance condition is satisfied when the reference time passes while power (e.g., the main voltage MNP) is not received after the memory devices 1311, 1312 . . . 1319 store data. It should be understood that the initiation condition need not be satisfied in order to output the notification NTF.

In some example embodiments, the controller 1330 may be configured to communicate with the host 1100 in compliance with the PCIe protocol. In such example embodiments, for example, the notification NTF may be output based on a WAKE # signal defined in the PCIe protocol.

The WAKE # signal may be used to switch an operation state of the storage device 1300 based on the auxiliary voltage AUXP, and thus may be employed usefully to communicate with the host 1100 in the power saving mode. However, this example is provided to facilitate better understanding, and the manner of outputting the notification NTF may be variously changed or modified as described above.

The host 1100 may control the power manager 1600 based on the notification NTF such that the main voltage MNP is supplied to the storage device 1300 (operation [6] of FIG. 5). Under control of the host 1100, the memory devices 1311, 1312 . . . 1319 and the controller 1330 may receive the main voltage MNP to operate in the normal mode (operation [7] of FIG. 5, S270*a* of FIG. 7), and the supply of the auxiliary voltage AUXP may be interrupted. Accordingly, the switching from the power saving mode to the normal mode may be provided, and a circumstance suitable for the data retention operation may be provided.

In the provided circumstance (e.g., in the normal mode), the memory devices 1311, 1312 . . . 1319 and the controller 1330 may start the maintenance operation in response to power (e.g., the main voltage MNP) being received (e.g., the controller 1330 may be responsive to the start of providing the main voltage MNP to the storage device 1300 to initiate the maintenance operation(s) of the memory devices 1311, 1312 . . . 1319). In some examples, providing main voltage MNP (an operation voltage) to the storage device 1300 is the only action that is needed by the host 1100 to cause initiation of the maintenance operation(s), and a separate command or other signal(s) provided from the host 1100 to the storage device 1300 are unnecessary. As the controller 1330 communicates with the memory devices 1311, 1312 . . . 1319, the data retention operation may be performed between the controller 1330 and the memory devices 1311, 1312 . . . 1319 using the power (e.g., the main voltage MNP) (operation [8] of FIG. 5, S270*b* of FIG. 7).

The data retention operation may be performed with regard to data stored in the memory devices 1311, 1312 . . . 1319. The data retention operation may be performed in response to the lapse or expiration of the reference time such that data stored in memory cells of the memory devices 1311, 1312 . . . 1319 is not lost.

For example, the data retention operation may include operations of reading the data stored in the memory devices 1311, 1312 . . . 1319 and storing the read data in the memory devices 1311, 1312 . . . 1319. These operations may be referred to as a read reclaim operation. According to the read reclaim operation, an adjustable physical characteristic of a memory cell that is compared to a reference value to determine data stored by the memory cell may be adjusted to correspond to the data intended to be stored by the memory cell. For example, a charge amount of a memory cell may be recharged (e.g., adjusted) to correspond to intended data of the memory cell. For example, a resistance value of a memory cell may be adjusted to correspond to the intended data of the memory cell. For example, a read reclaim operation with respect to a memory device (e.g. one of 131, 1312, . . . 1319)—each of which may be a non-volatile memory semiconductor chip—may read data from a page of memory cells of an array of memory cells, such as NAND flash memory cells or other non-volatile memory cells, to a page buffer of the memory device. The read reclaim operation may then perform a program operation to write the data stored in the page buffer directly to the same page from which the data has just been read without transferring the read data from the page buffer and/or modifying the data in the page buffer. In performing the programming operation to write the data stored in the page buffer, the adjustable physical characteristic (e.g., resistance value or charge storage) of memory cells of the page of memory cells that do not correspond to a desired level (e.g., to or above a corresponding predetermined level and/or within a corresponding predetermined range) may be adjusted to a corresponding desired level Accordingly, data may be retained before the data is lost. The read reclaim operation may be a refresh operation of data stored in the nonvolatile memory. However, the present invention is not limited thereto, and the data retention operation may be variously changed or modified such that data is retained before the data is lost. For example, as part of a read reclaim operation, erroneous data bits of read data may be detected and corrected using an error correction circuit and error correction code. The error correction circuit may be part of the storage device 1300 (e.g., part of controller 1330) or may be provided externally to the storage device 1300 (e.g., as part of the host 1100). In the latter instance, a read reclaim operation may comprise transmitting read data to the error correction circuit located externally to the storage device and receiving corrected data to be written to the storage device. In some instances, in this latter approach, the read data may remain in the page buffer to have certain bits corrected and/or corrected data may be stored in the memory array at pages other than the page from which the data was originally read.

As such, the storage device 1300 may determine the maintenance condition by itself and thus may perform the data retention operation independently. The host 1100 may not intervene in the data retention operation except for controlling the supply of the main voltage MNP to cause the switching to the normal mode. Accordingly, the data retention operation may be performed efficiently, and data reliability may be improved.

Referring to FIG. 6, after the data retention operation is completed, the controller 1330 may provide the host 1100 with information associated with a result of the data retention operation. For example, the controller 1330 may notify the host 1100 that the data retention operation is done (operation [9] of FIG. 6, S280a of FIG. 7). Afterwards, under control of the host 1100 and/or the controller 1330, the operation state of the storage device 1300 may be switched from the normal mode to the power saving mode (operation [10] of FIG. 6).

In response to the switching from the normal mode to the power saving mode, the reference time of the timer 1332 may be set (operation [11] of FIG. 6, S280b of FIG. 7), and the timer 1332 may start to monitor the reference time without intervention of the host 1100. The memory devices 1311, 1312 . . . 1319 and the controller 1330 may stop operations fully or partially.

The supply of the main voltage MNP may be interrupted, but the auxiliary voltage AUXP may be received to operate the timer 1332 (operation [12] of FIG. 6, S280b of FIG. 7). Accordingly, the operation states of the memory devices 1311, 1312 . . . 1319 and the controller 1330 may return to operation states before the data retention operation is performed.

Figure 8:
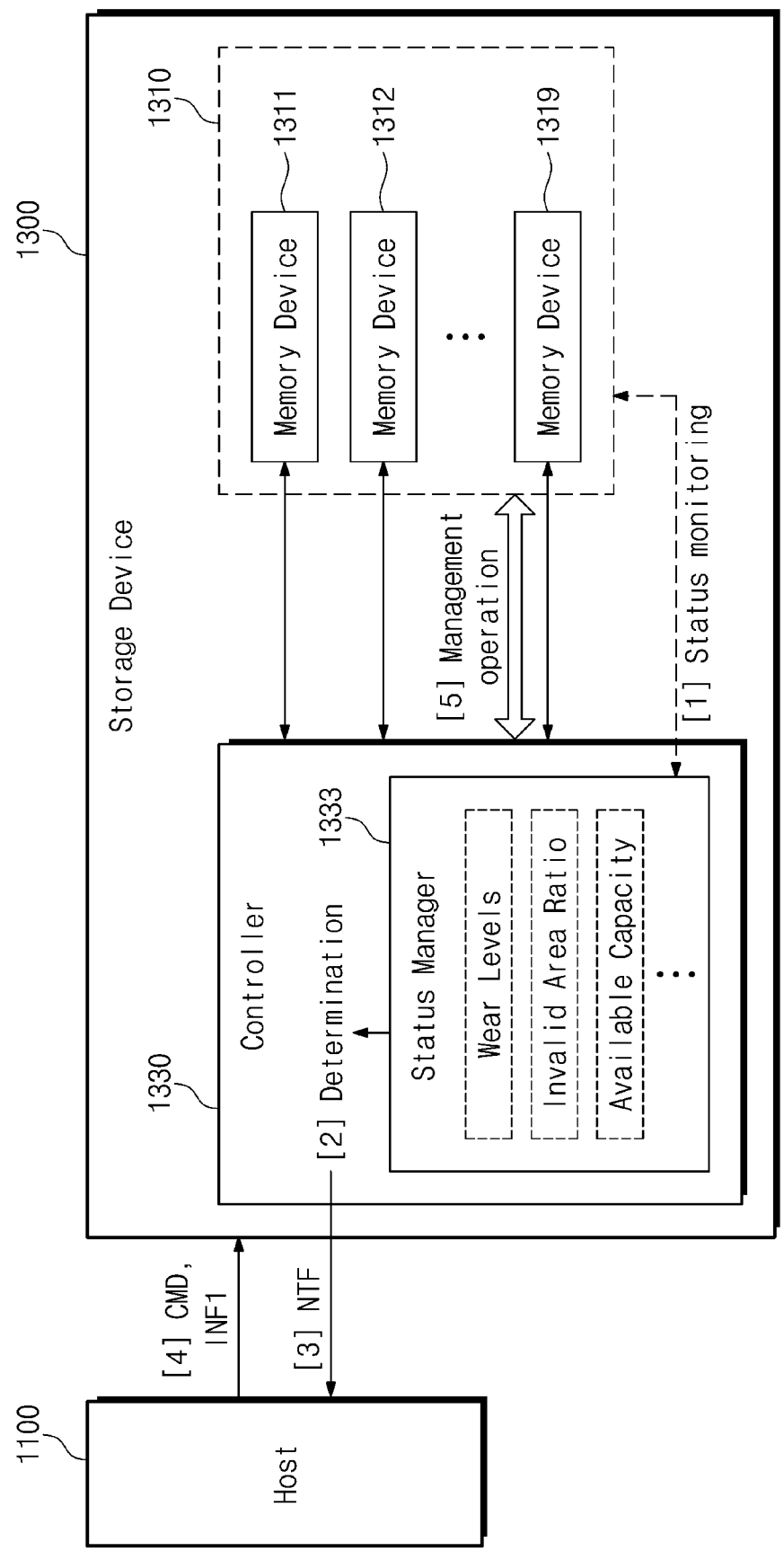
FIGS. 8 and 9 are conceptual diagrams for describing an example operation of a storage device of FIG. 2 according to some example embodiments.
Figure 9:
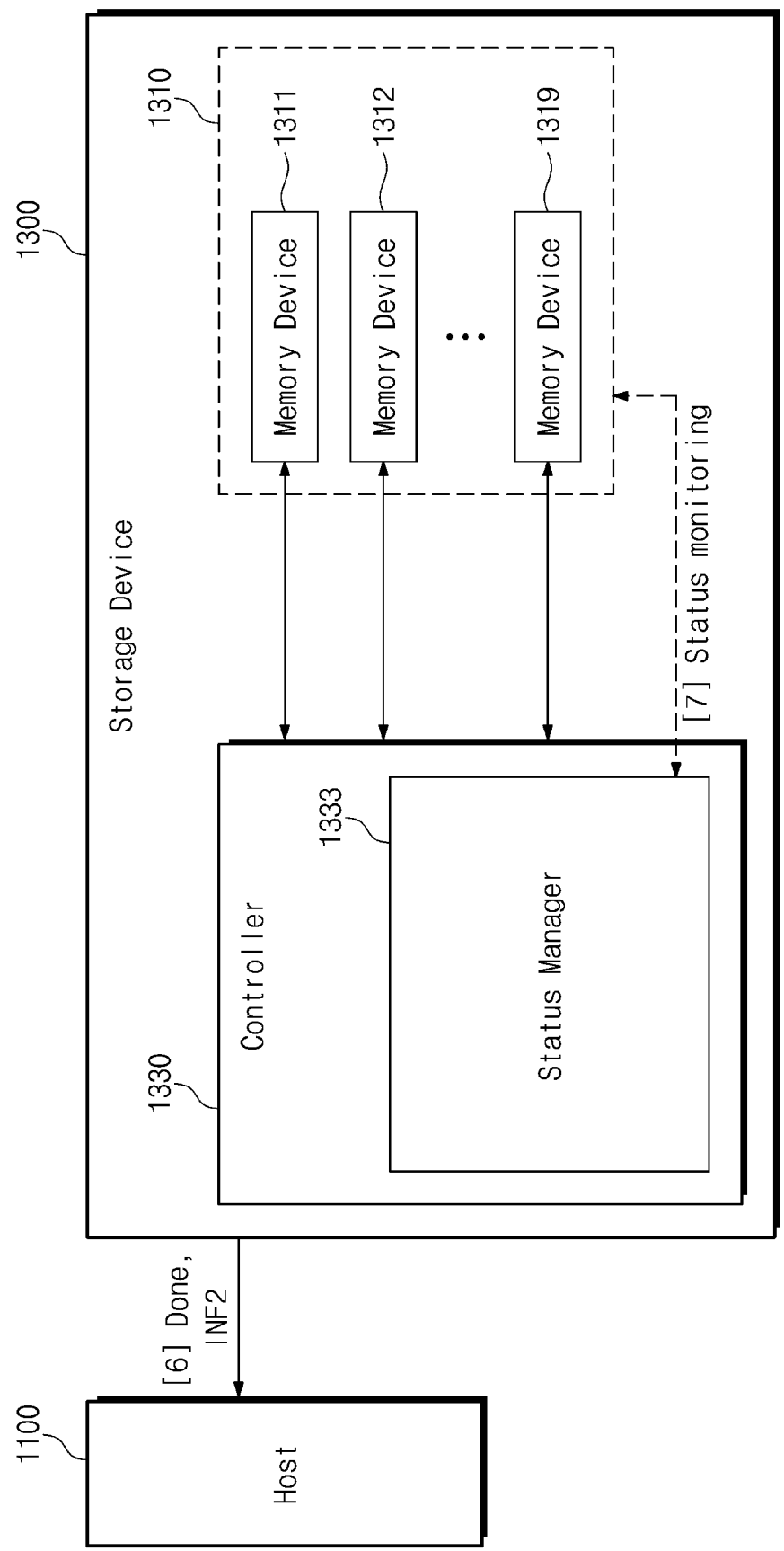
Figure 10:
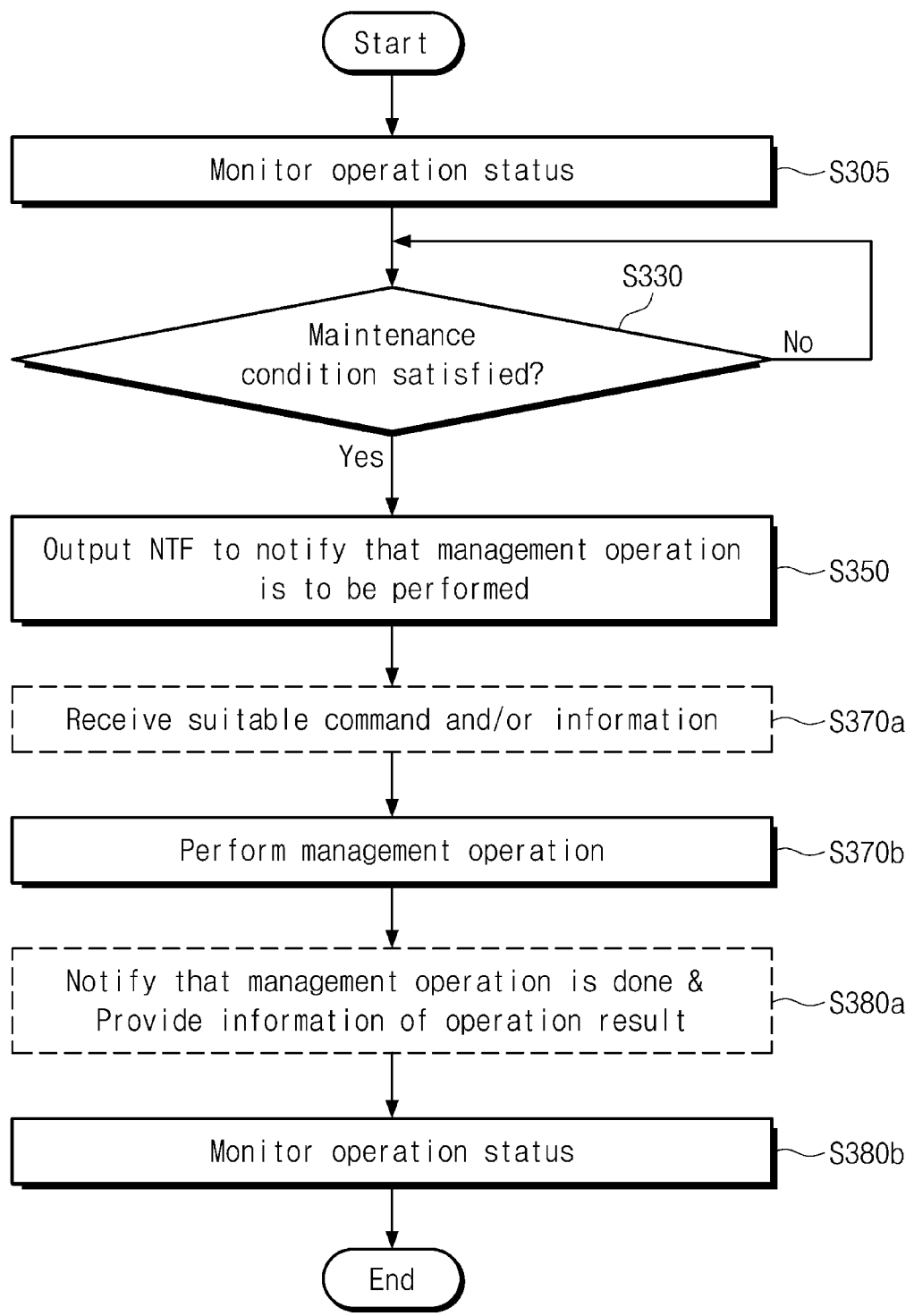
FIG. 10 is a flowchart describing an example operation of FIGS. 8 and 9.

FIGS. 8 and 9 are conceptual diagrams for describing an example operation of the storage device 1300 of FIG. 2 according to some example embodiments. FIG. 10 is a flowchart describing an example operation of FIGS. 8 and 9.

Referring to FIG. 8, the controller 1330 may monitor a status associated with the memory devices 1311, 1312 . . . 1319 by using the status manager 1333 (operation [1] of FIG. 8, S305 of FIG. 10). For example, the monitored status may include wear levels of memory regions included in the memory devices 1311, 1312 . . . 1319, a ratio of invalid memory regions of the memory regions included in the memory devices 1311, 1312 . . . 1319, an available capacity of the memory devices 1311, 1312 . . . 1319, etc., but the present invention is not limited thereto.

The controller 1330 may determine whether the monitored status satisfies the maintenance condition, by using the status manager 1333 (S330 of FIG. 10). For example, when a numerical value of the monitored status reaches a corresponding threshold value, the maintenance condition may be satisfied. The threshold value may be selected (e.g., programmed) taking into account a degree of a status in which the maintenance operation is required.

For example, when a memory device includes memory regions having high wear levels, data stored in the memory device may become unreliable. When one or more of the wear levels reach a first threshold value (e.g., become higher than the first threshold value), the maintenance condition for guaranteeing data reliability may be satisfied.

For example, when a ratio of invalid memory regions of the memory regions included in a memory device increases, an access to the memory device may become inefficient. When the ratio of the invalid memory regions reaches a second threshold value (e.g., becomes higher than the second threshold value), the maintenance condition for an efficient memory access may be satisfied.

For example, when an available capacity of the memory devices 1311, 1312 . . . 1319 decreases, it may become difficult to store additional pieces of data. When the available capacity reaches a third threshold value (e.g., becomes lower than the third threshold value), the maintenance condition for increasing the available capacity may be satisfied.

When the maintenance condition is not satisfied (No of S330 of FIG. 10), the controller 1330 may still monitor the status associated with the memory devices 1311, 1312 . . . 1319. When it is determined that the maintenance condition is satisfied (operation [2] of FIG. 8, Yes of S330 of FIG. 10), the storage device 1300 may output the notification NTF based on the determination (operation [3] of FIG. 8, S350 of FIG. 10). The notification NTF may be maintenance notification to the host 1100 in response to determining that one or more of the nonvolatile memory devices require maintenance to provide a period of time in which the solid state storage device may not be accessed by the host 1100 during which the controller may perform one or more maintenance operations on the one or more nonvolatile devices.

The notification NTF may be output to notify that the maintenance operation for improving the monitored status (hereinafter referred to a management operation) is to be performed. For example, the notification NTF may be output using the WAKE # signal or may be output through a channel for exchanging the data DAT. However, this example is provided to facilitate better understanding, and the manner of outputting the notification NTF may be variously changed or modified as described above.

In some cases, the command CMD of the host 1100 may be required to perform the management operation. In some cases, data INF1 to be referenced to perform the management operation may be stored only in the host 1100. In such cases, the host 1100 may provide the command CMD and/or the data INF1 to the storage device 1300 (operation [4] of FIG. 8, S370a of FIG. 10). For example, INF1 may identify an idle time of the host 1100 in which the host 1100 is not scheduled to access or otherwise communicate with storage device 1300. The controller 1330 may be responsive to the idle time (received as INF1) to perform maintenance operations on the memory devices 1311, 1312, . . . 1319 during the idle time and to discontinue maintenance operations on the memory devices 1311, 1312, . . . 1319 upon expiration of the idle time. In some examples, data INF1 may comprise wear levels of blocks of memory of the memory devices 1311, 1312, . . . 1319, bad block information comprising physical addresses of bad blocks that should not be used in any data writing maintenance operations, address mapping correlating logical address to physical addresses of the memory devices 1311, 1312, . . . 1319, etc. Accordingly, under control of the host 1100, a circumstance suitable for the management operation may be provided. On the other hand, when the management operation which does not requires the command CMD and the data INF1 is performed, this process regarding the data INF1 may be omitted.

In the provided circumstance (e.g., based on the command CMD and/or the data INF1), as the controller 1330 communicates with the memory devices 1311, 1312 . . . 1319, the management operation may be performed by the controller 1330 on the memory devices 1311, 1312 . . . 1319 (operation [5] of FIG. 8, S370b of FIG. 10).

For example, when one or more of the wear levels reach the reference value, the management operation may be performed such that data of a memory region having a wear level which reaches the first threshold value migrates to a memory region having a wear level which does not reach the first threshold value among the memory regions of the memory devices 1311, 1312 . . . 1319. In this case, the data may be stored in a memory region having a low wear level (i.e., providing high reliability).

For example, when the ratio of invalid memory regions in a memory device reaches the second threshold value, the management operation may include a garbage collection operation for moving data of valid memory regions of memory regions included in the memory device or included in another memory device. In this case, the data of the valid memory regions may be stored in the minimum number of memory regions, and an efficient memory access may become available.

For example, when the available capacity is less than the third threshold value, the management operation may include operations of uploading data stored in the memory devices 1311, 1312 . . . 1319 to a remote server (e.g., a cloud storage) through the communication block 1400 and deleting the corresponding data from the memory devices 1311, 1312 . . . 1319. In this case, the available capacity of the memory devices 1311, 1312 . . . 1319 may increase.

As such, the storage device 1300 may determine the maintenance condition by itself and thus may perform the management operation actively. In this example, the host 1100 may not be required to participate in the management operation except for providing the command CMD and the data INF1 required for the management operation. Accordingly, the management operation may be performed efficiently, and reliability, performance, and management efficiency of the storage device 1300 may be improved.

The above management operations are intended to provide some of possible example embodiments to facilitate better understanding, and are not intended to limit the present invention. The management operation may be variously changed or modified to improve a status associated with the memory devices 1311, 1312 . . . 1319. The management operations may be performed in parallel (e.g., simultaneously or concurrently) or sequentially on two or more statuses.

Referring to FIG. 9, after the management operation is completed, the controller 1330 may provide the host 1100 with information associated with a result of the management operation (operation [6] of FIG. 9, S380a of FIG. 10). For example, the controller 1330 may notify the host 1100 that the management operation is done.

In some cases, data may migrate among the memory devices 1311, 1312 . . . 1319. In such cases, the controller 1330 may provide information INF2 to the host 1100 to notify a location (e.g., address(es)) of a new memory region where the migrated data is stored. A request (e.g., a write/read request) which is received from the host 1100 after the management operation is completed may be directed to the new memory region based on the information INF2. Besides, the information INF2 may include a variety of information associated with a result of the management operation.

On the other hand, some management operations may not generate information to be provided to the host 1100. In this case, this process regarding the information INF2 may be omitted.

Afterwards, the controller 1330 may monitor a status associated with the memory devices 1311, 1312 . . . 1319 by using the status manager 1333 (operation [7] of FIG. 9, S380b of FIG. 10). Accordingly, the operation states of the memory devices 1311, 1312 . . . 1319 and the controller 1330 may return to operation states before the management operation is performed.

FIGS. 11 to 14 are conceptual diagrams for describing an example operation of the storage device 1300 of FIG. 2 according to some example embodiments. FIG. 15 is a flowchart describing an example operation of FIGS. 11 to 14.

Figure 11:
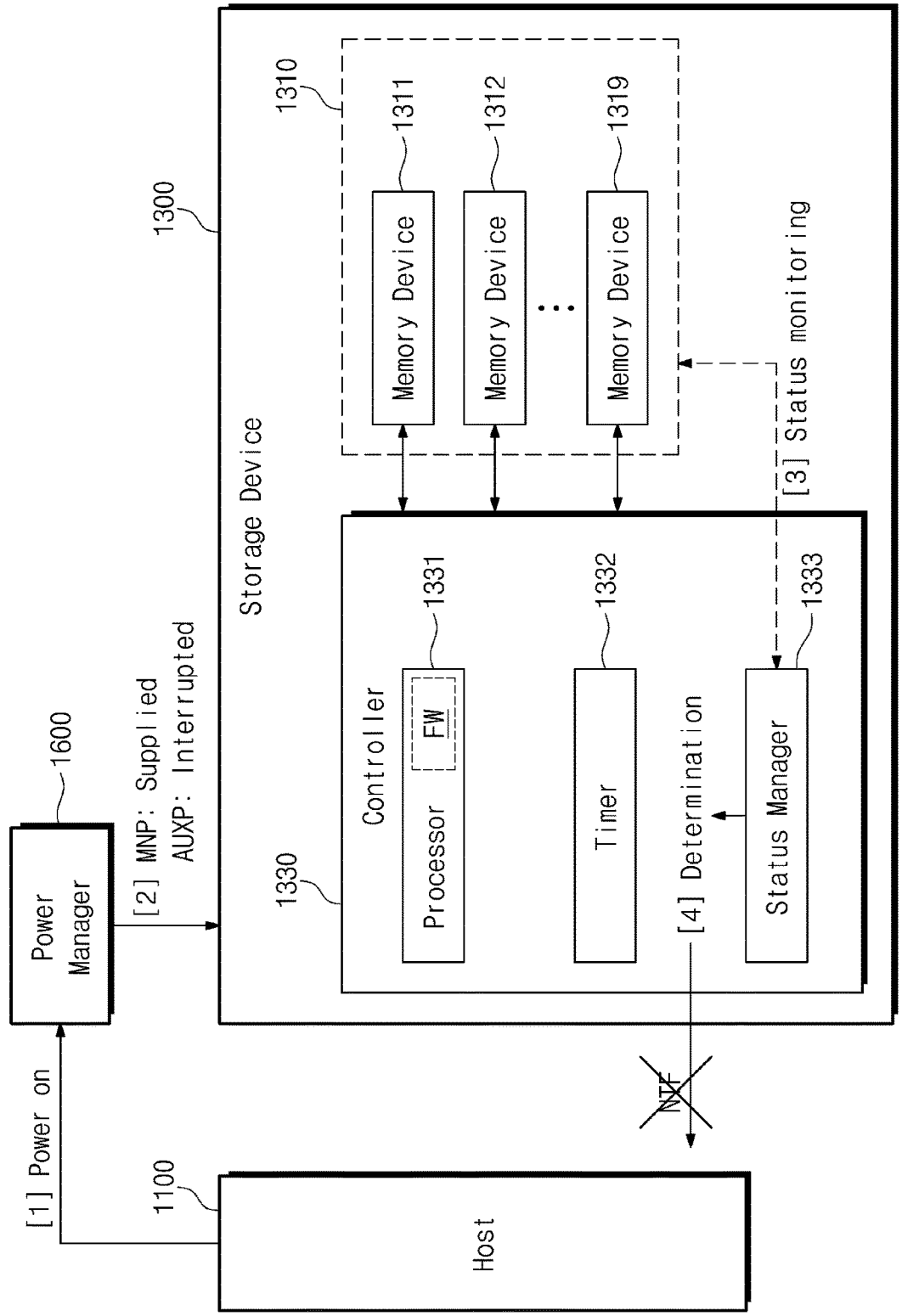
FIGS. 11 to 14 are conceptual diagrams for describing an example operation of a storage device of FIG. 2 according to some example embodiments.

Referring to FIG. 11, under control of the host 1100 and/or the controller 1330, an operation of the normal mode may be provided (operation [1] of FIG. 11). In the normal mode, the power manager 1600 may provide the main voltage MNP to the storage device 1300, and the supply of the auxiliary voltage AUXP may be interrupted (operation [2] of FIG. 11).

The controller 1330 may monitor a status associated with the memory devices 1311, 1312 . . . 1319 by using the status manager 1333, based on power (e.g., the main voltage MNP) received in the normal mode (operation [3] of FIG. 11, S405 of FIG. 15). When the maintenance condition is not satisfied (No of S430a of FIG. 15), the controller 1330 may continue monitor the status associated with the memory devices 1311, 1312 . . . 1319.

During the monitoring of the status (S405, S430a of FIG. 15), the controller 1330 may determine that the monitored status satisfies the maintenance condition (operation [4] of FIG. 11, Yes of S430a of FIG. 15). The controller 1330 may determine whether the initiation condition is satisfied (e.g., whether resources are available for the memory devices 1311, 1312 . . . 1319 and the controller 1330 to perform the management operation) (S431 of FIG. 15), instead of immediately outputting the notification NTF based on the determination of the maintenance condition.

When the initiation condition is satisfied (Yes of S431 of FIG. 15), the management operation may be performed on the memory devices 1311, 1312 . . . 1319 by the controller 1330 (S435 of FIG. 15). However, when the initiation condition is not satisfied (e.g., when the storage device 1300 is busy, such as being occupied by access operations at the request of host 1100) (No of S431 of FIG. 15), the management operation may not be performed immediately and may be postponed. In this example, the initiation condition may be provided independently of the maintenance condition. For example, when the switching to the power saving mode is not provided (No of S410 of FIG. 15), the management operation may not be performed. However, in some examples, when the switching to the power saving mode is not provided (No of S410 of FIG. 15), the method may revert back to step S431 (to periodically check if the initiation condition is satisfied or may revert back to step S405 (to continue to monitor operation status (S405) and to later periodically check if the initiation condition (S431) is satisfied. During this repetitive loop operation, if the storage device 1300 is to be put into a power savings mode (S410), the method may proceed to step S420.

Figure 12:
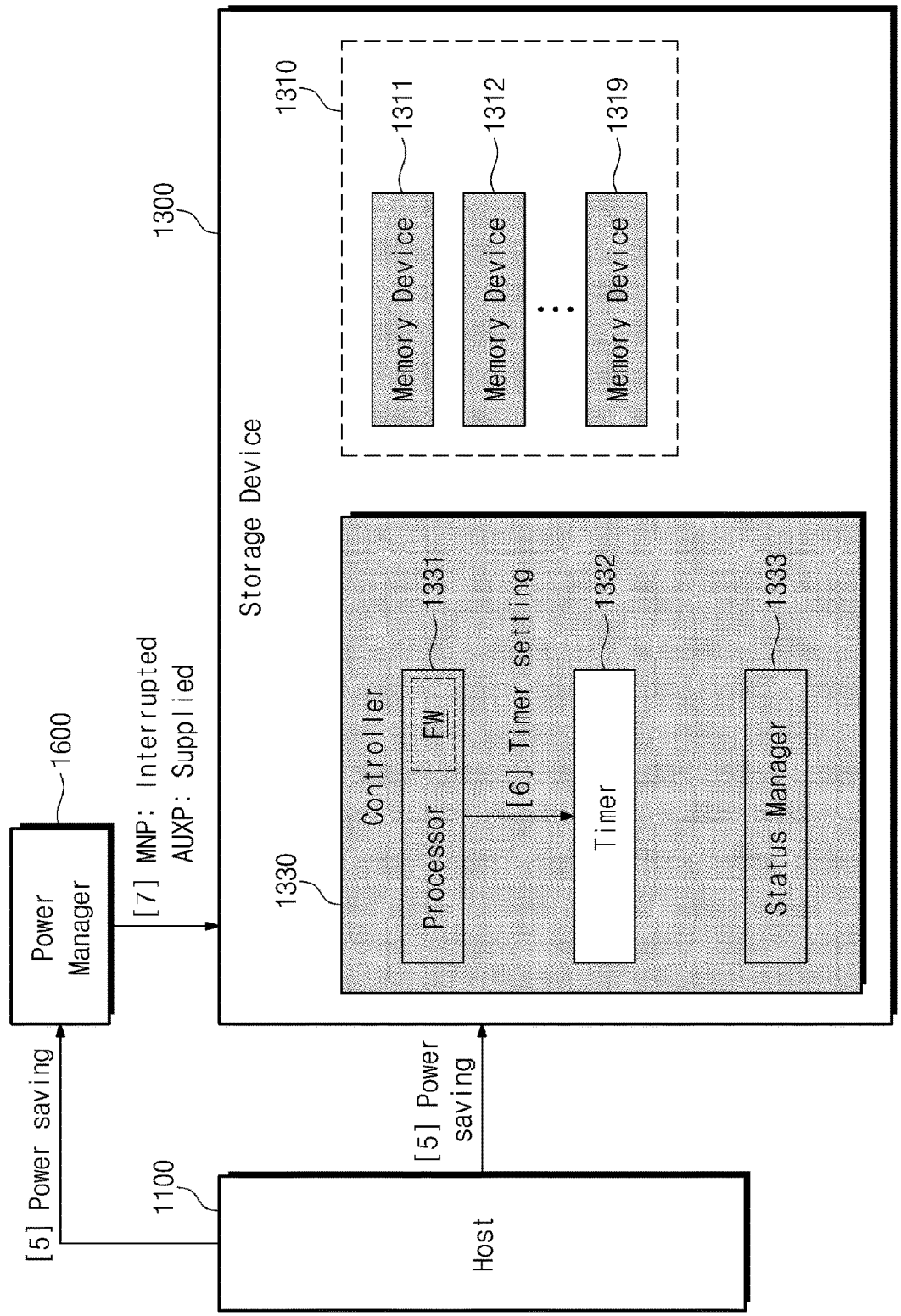

Referring to FIG. 12, under control of the host 1100 and/or the controller 1330, the switching to the power saving mode may be provided (operation [5] of FIG. 12, Yes of S410 of FIG. 15). In response to the switching to the power saving mode, the reference time of the timer 1332 may be set (operation [6] of FIG. 12, S420 of FIG. 15), and the timer 1332 may start to monitor the reference time.

Meanwhile, the supply of the main voltage MNP may be interrupted, but the auxiliary voltage AUXP may be received to operate the timer 1332 (operation [7] of FIG. 12, S420 of FIG. 15). The memory devices 1311, 1312 . . . 1319 and the controller 1330 may stop an operation fully or partially.

When the reference time measured by the timer 1332 does not elapse or expire (No of S430b of FIG. 15), the timer 1332 may continue to monitor the reference time. On the other hand, referring to FIG. 13, when the reference time elapses or expires (Yes of S430b of FIG. 15), the timer 1332 may output a signal indicating the lapse or expiration of the reference time (operation [8] of FIG. 13).

The reference time may be selected to be suitable to determine that the storage device 1300 is idle. The lapses or expiration of the reference time may mean that the storage device 1300 is idle during the reference time. Accordingly, the lapse or expiration of the reference time may be regarded as the initiation condition being satisfied. In some examples, prior to expiration of a first period of the reference time monitored by the timer 1332, the timer 1332 may be reset to monitor expiration of a second period of the reference time in response to the storage device 1300 being brought out of the power saving mode and/or put into normal mode (e.g., by a command from host 1100) and the timer 1332 may start to monitor expiration of the second period of the reference time. For example, a command to be put into normal mode (e.g., by host 1100) may cause the method of FIG. 15 to revert back to step S405 and to perform the step of resetting the timer 1332 to monitor expiration of a second period of the reference time.

Figure 13:
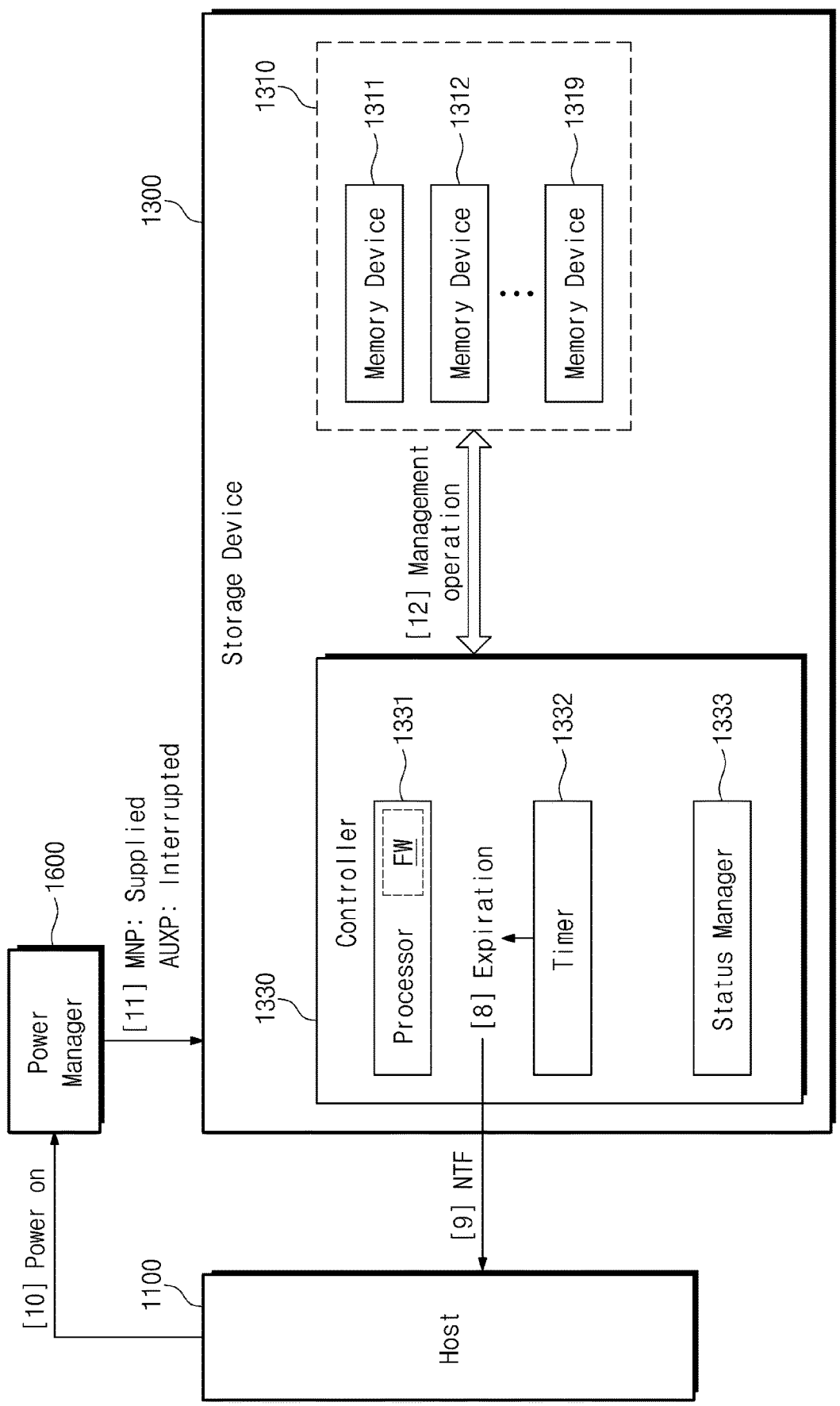

The storage device 1300 may output the notification NTF to the host 1100 based on the signal output from the timer 1332 (i.e., based on the lapse or expiration of the reference time) (operation [9] of FIG. 13, S450 of FIG. 15). The notification NTF may be output to notify that the management operation is to be performed.

The host 1100 may control the power manager 1600 based on the notification NTF such that the main voltage MNP is supplied to the storage device 1300 (operation [10] of FIG. 13). Under control of the host 1100, the memory devices 1311, 1312 . . . 1319 and the controller 1330 may receive the main voltage MNP to operate in the normal mode (operation [11] of FIG. 13, S470a of FIG. 15), and the supply of the auxiliary voltage AUXP may be interrupted. Accordingly, the switching to the normal mode may be provided, and a circumstance for performing the management operation may be provided.

In the provided circumstance (e.g., in the normal mode), the memory devices 1311, 1312 . . . 1319 and the controller 1330 may start an operation using the newly supplied power (e.g., the main voltage MNP). As the controller 1330 communicates with the memory devices 1311, 1312 . . . 1319, the management operation may be performed between the controller 1330 and the memory devices 1311, 1312 . . . 1319 (operation [12] of FIG. 13, S470b of FIG. 15).

Figure 14:
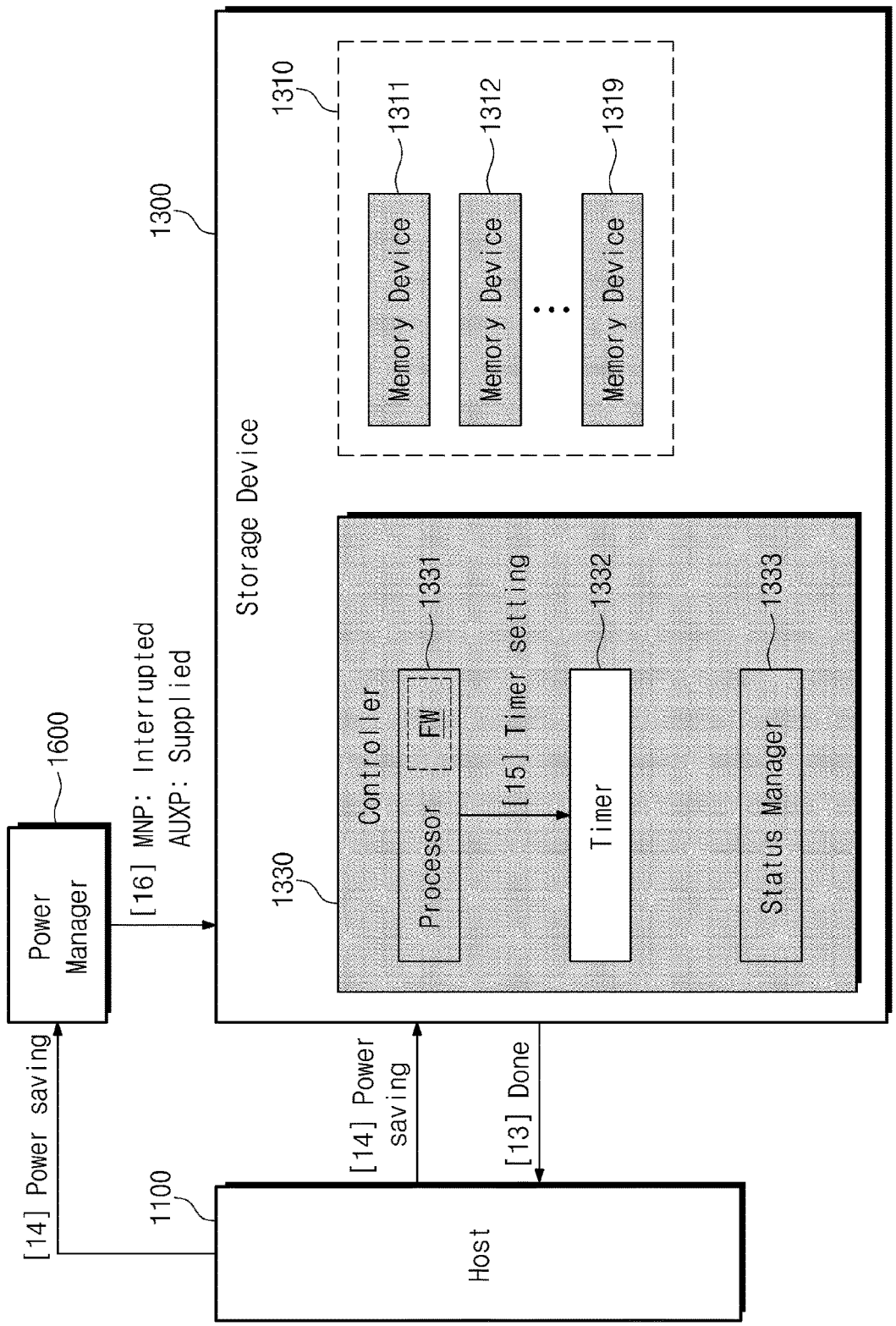
Figure 15:
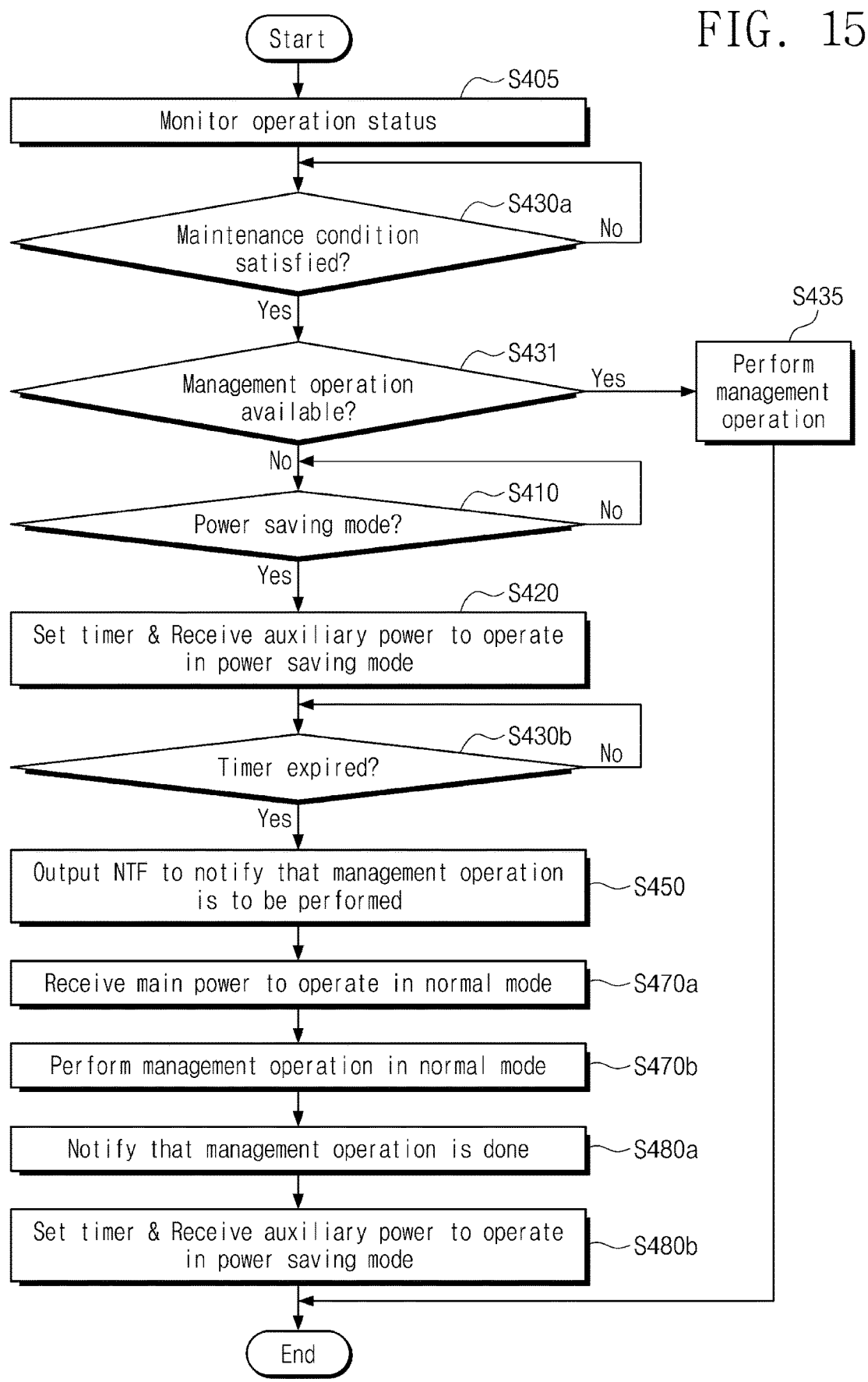
FIG. 15 is a flowchart describing an example operation of FIGS. 11 to 14.

Referring to FIG. 14, after the management operation is completed, the controller 1330 may provide the host 1100 with information associated with a result of the management operation (operation [13] of FIG. 14, S480a of FIG. 15). Afterwards, under control of the host 1100 and/or the controller 1330, the operation state of the storage device 1300 may be switched back to the power saving mode (operation [14] of FIG. 14).

In response to the switching back to the power saving mode, the reference time of the timer 1332 may be set (operation [15] of FIG. 14, S480b of FIG. 15), and the timer 1332 may start to measure the reference time without intervention of the host 1100. The memory devices 1311, 1312 . . . 1319 and the controller 1330 may stop an operation fully or partially.

The supply of the main voltage MNP may be interrupted, but the auxiliary voltage AUXP may be received to operate the timer 1332 (operation [16] of FIG. 14, S480b of FIG. 15). Accordingly, the operation states of the memory devices 1311, 1312 . . . 1319 and the controller 1330 may return to operation states before the management operation is performed.

Example maintenance operations have been described above, but it may be readily understood that the present invention may be variously changed or modified from the above example embodiments. As described above, the maintenance operation may be performed according to predetermined procedures. Alternatively, the maintenance operation may be performed according to a procedure selected from among a plurality of procedures based on a condition. In some example embodiments, a kind and a manner of the maintenance operation may be updated or modified by the user or the storage device 1300.

Figure 16:
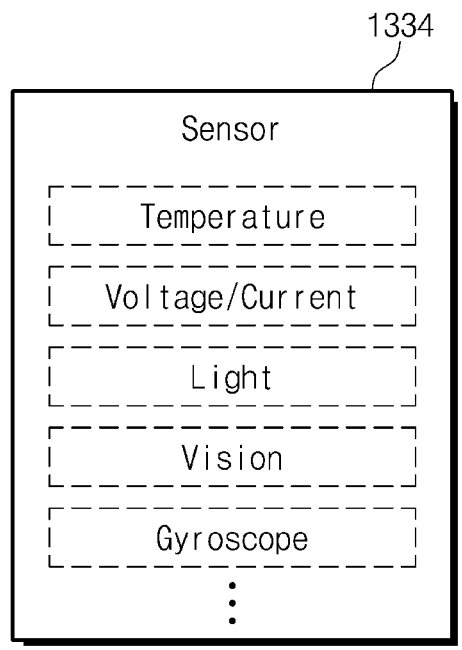
FIGS. 16 and 17 are block diagrams illustrating example configurations associated with a storage device of FIG. 2.

FIG. 16 is a block diagram illustrating an example configuration associated with the storage device 1300 of FIG. 2.

The sensor 1334 may sense various kinds of events. An event detected by the sensor 1334 may be referenced as the maintenance condition and/or the initiation condition.

For example, the sensor 1334 may include a temperature sensor. The temperature sensor may be used to measure or estimate a temperature of the memory devices 1311, 1312 ... 1319 and/or an ambient temperature of in which the memory devices 1311, 1312 ... 1319 operate (e.g., the temperature of an internal space in the housing of the solid state storage device in which the memory devices operate). When a temperature of a memory device is higher than or equal to the reference value, data stored in the memory device may become unreliable. Accordingly, when the temperature measured or estimated by the temperature sensor is higher than or equal to the reference value, the maintenance condition may be satisfied.

For example, the sensor 1334 may include a voltage/current sensor (a voltage sensor and/or a current sensor). The voltage/current sensor may be used to monitor (e.g., measure) a voltage and/or a current provided to the memory devices 1311, 1312 ... 1319. When an excessive voltage or current is provided to a memory device, an error may occur in data stored in the memory device. Accordingly, when the voltage and/or the current measured by the voltage/current sensor is higher than or equal to the reference value, the maintenance condition may be satisfied.

For example, the sensor 1334 may include a light sensor to detect light external to the storage device 1330, a vision sensor to detect an eye of a user, a gyroscope sensor to detect an orientation of the storage device 1300, etc. In some example embodiments, the light sensor, the vision sensor, and the gyroscope sensor may be provided outside the storage device 1300 (e.g., mounted to an external surface of a housing of the storage device 1300).

For example, when the electronic system 1000 including the storage device 1300 is in a dark environment, when a user does not look at the electronic system 1000 including the storage device 1300, or when the electronic system 1000 including the storage device 1300 is on a planar surface, these may mean that the storage device 1300 is not used (e.g., idle).

When the electronic system 1000 is in a dark environment, the light sensor may not sense light. When the user does not look at the electronic system 1000, the vision sensor may not sense user's eyes. The gyroscope sensor may sense that the electronic system 1000 is left on the planar surface. Accordingly, the light sensor, the vision sensor, and the gyroscope sensor may be used to determine whether the initiation condition is satisfied.

The above examples are intended to provide some of possible example embodiments, and are not intended to limit the present invention. A configuration and an operation of the sensor 1334 may be variously changed or modified.

Figure 17:
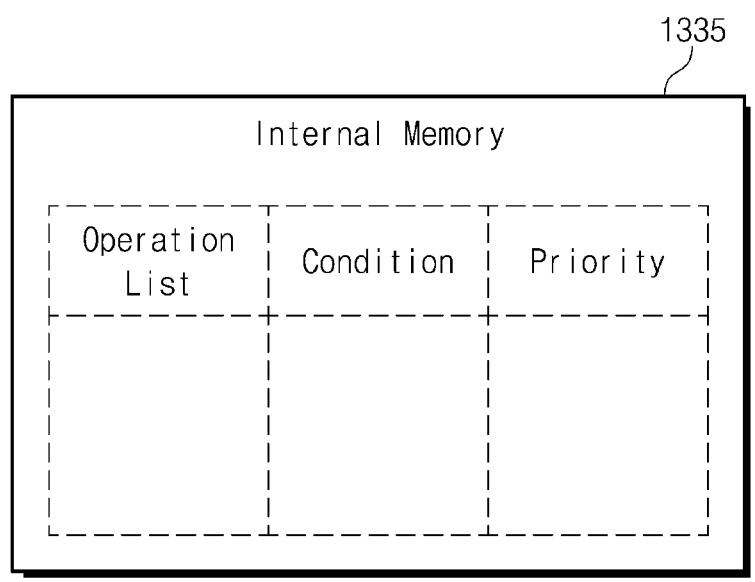

FIG. 17 is a block diagram illustrating an example configuration associated with the storage device 1300 of FIG. 2.

The internal memory 1335 may store information associated with the maintenance operation. For example, when the management operation is postponed as described with reference to FIGS. 11 to 15, the internal memory 1335 may manage a list of management operations to be performed after the initiation condition is satisfied. The controller 1330 may refer to the information of the internal memory 1335 to perform the maintenance operation.

In some cases, the maintenance operations may be performed for two or more statuses. For example, the controller 1330 may monitor a first status and a second status associated with the memory devices 1311, 1312 ... 1319. The second status may be different from the first status.

When the first status satisfies a first maintenance condition, a first maintenance operation associated with the first status may be performed. In addition, when the second status satisfies a second maintenance condition, a second maintenance operation associated with the second status may be performed. Under control of the controller 1330, the internal memory 1335 may manage a list of the first maintenance operation and the second maintenance operation to manage that the first maintenance operation and the second maintenance operation are to be performed.

When both the first maintenance condition and the second maintenance condition are satisfied, the controller 1330 may schedule a performance order of the first maintenance operation and the second maintenance operation, and may manage priorities based on the scheduled performance order in the internal memory 1335. The controller 1330 may refer to the list of the internal memory 1335 such that the first maintenance operation and the second maintenance operation are performed based on the scheduled performance order.

In some cases, a first initiation condition for initiating the first maintenance operation may be different from a second initiation condition for initiating the second maintenance operation. The controller 1330 may manage the initiation conditions for initiating respective maintenance operations in the internal memory 1335. The controller 1330 may refer to the list of the internal memory 1335 such that the first maintenance operation and the second maintenance operation are performed based on the respective initiation conditions.

The above examples are provided to facilitate better understanding, and are not intended to limit the present invention. The information managed in the internal memory 1335 may be variously changed or modified.

Figure 18:
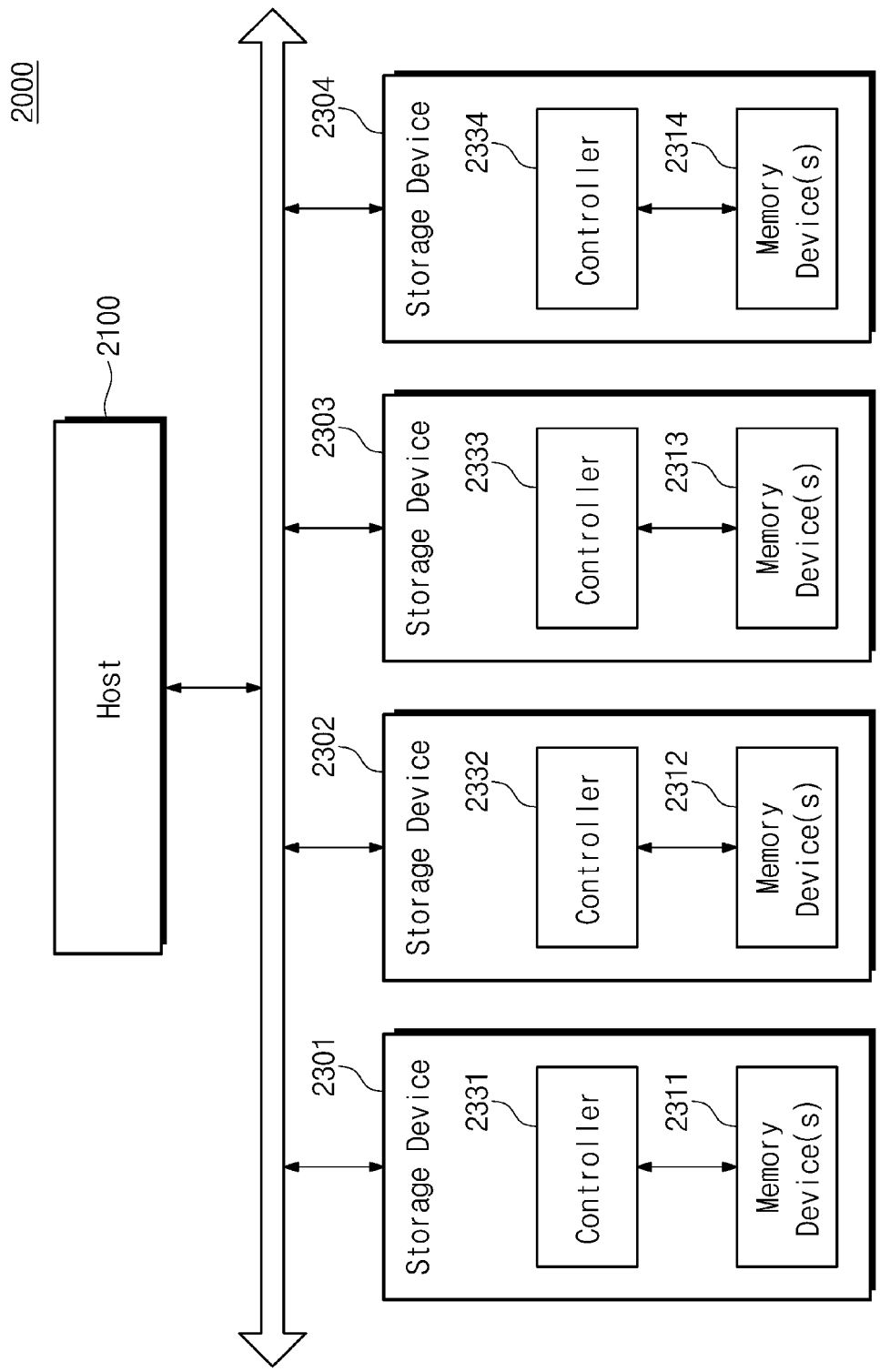
FIG. 18 is a block diagram illustrating an example configuration of an electronic system which includes storage devices according to some example embodiments.

FIG. 18 is a block diagram illustrating an example configuration of an electronic system 2000 which includes storage devices 2301, 2302, 2303, and 2304 according to some example embodiments.

The electronic system 2000 may include a host 2100 and the plurality of storage devices 2301, 2302, 2303, and 2304. For example, the electronic system 2000 may be a large-scale electronic device such as a workstation or a server, or may be an electronic device providing a large storage capacity.

The host 2100 may correspond to the host 1100 described with reference to FIGS. 2 to 15. Each of the storage devices 2301, 2302, 2303, and 2304 may correspond to the storage device 1300 described with reference to FIGS. 2 to 15, and may be connected to the host 2100 through a bus. The storage devices 2301, 2302, 2303, and 2304 may include memory devices 2311, 2312, 2313, and 2314 and controllers 2331, 2332, 2333, and 2334, respectively. FIG. 18 illustrates four storage devices 2301, 2302, 2303, and 2304, but it may be readily understood that the number of storage devices included in the electronic system 2000 may be variously changed or modified.

At least one of the storage devices 2301, 2302, 2303, and 2304 may be configured and operate to be substantially identical or similar to the storage device 1300, and may initiate and perform the maintenance operation actively without intervention of the host 2100. Configurations and operations of the storage devices 2301, 2302, 2303, and 2304 may be provided as described with reference to FIGS. 2 to 17, and thus redundant description will be omitted below for brevity.

Meanwhile, when the plurality of storage devices 2301, 2302, 2303, and 2304 is provided, the maintenance operation may be performed among the storage devices 2301, 2302, 2303, and 2304. The storage devices 2301, 2302, 2303, and 2304 may communicate with one another to perform the maintenance operation. This will be described with reference to FIGS. 19 and 20.

The host 2100 may provide a circumstance suitable for the maintenance operation. However, the host 2100 may not intervene in the maintenance operation except for providing the suitable circumstance. For example, the host 2100 may not intervene in the maintenance operation until the maintenance operation is completed after the suitable circumstance is provided.

Figure 19:
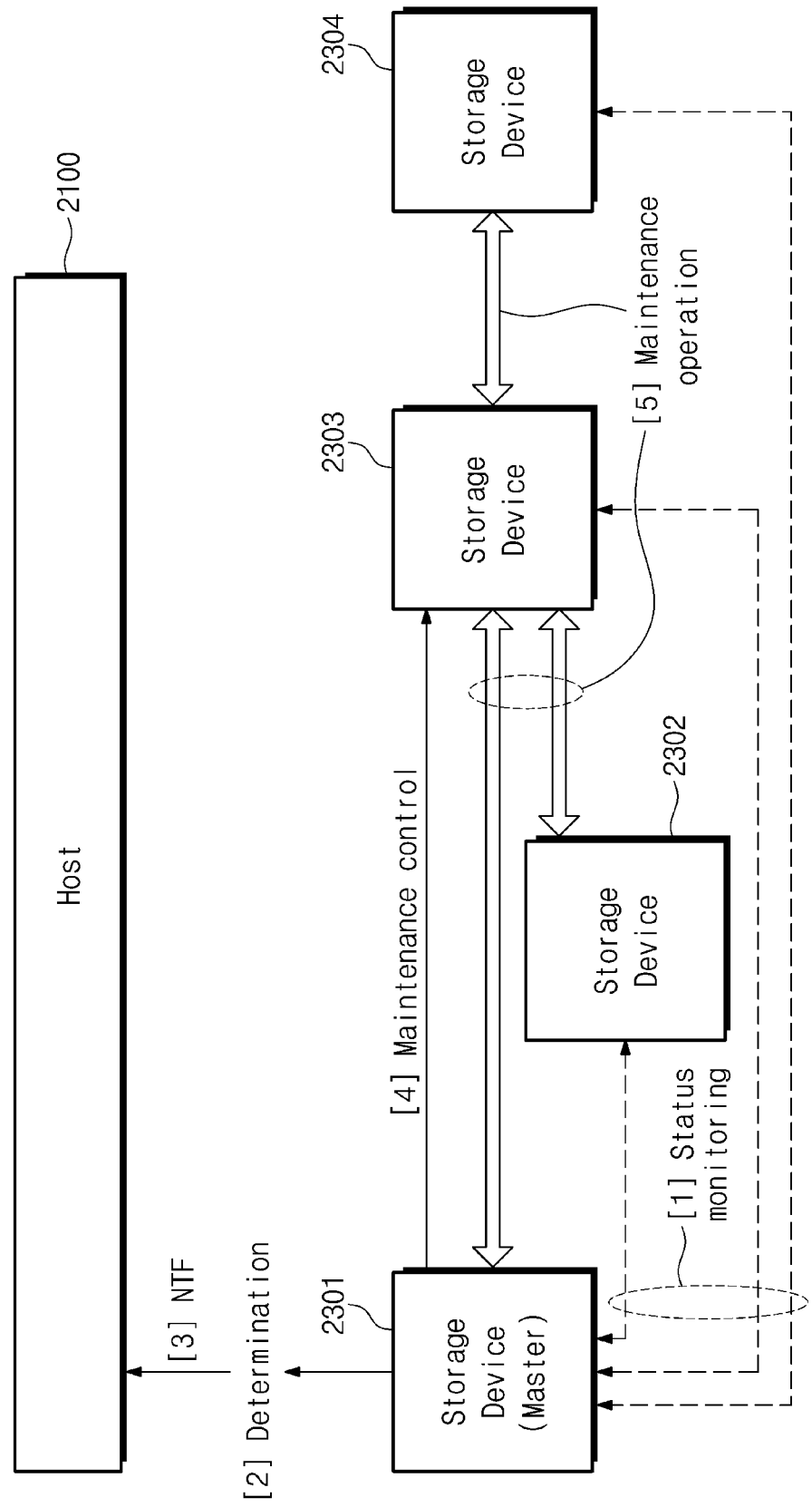
FIGS. 19 and 20 are conceptual diagrams for describing example operations of storage devices of FIG. 18.

FIG. 19 is a conceptual diagram for describing an example operation of the storage devices 2301, 2302, 2303, and 2304 of FIG. 18.

For example, one storage device 2301 among the storage devices 2301, 2302, 2303, and 2304 may be configured and operate to be substantially identical or similar to the storage device 1300. The storage device 2301 may act as a master device such that the maintenance operation is performed among the storage devices 2301, 2302, 2303, and 2304 without intervention of the host 2100. The storage device 2301 may take charge of the overall maintenance operation. However, the present invention is not limited thereto, and the number of storage devices acting as a master device may be variously changed or modified.

The storage device 2301 may monitor a status associated with the memory devices 2311, 2312, 2313, and 2314 of the storage devices 2301, 2302, 2303, and 2304 without intervention of the host 2100 (operation [1]). To this end, the storage device 2301 may directly access the storage devices 2302, 2303, and 2304 or may receive status information from the storage devices 2302, 2303, and 2304.

It is assumed that a status associated with the memory device 2313 of the storage device 2303 satisfies the maintenance condition. For example, as the storage device 2303 becomes deteriorated, data stored in the memory device 2313 may become unreliable. The storage device 2301 may determine the maintenance condition (operation [2]), and may output the notification NTF to the host 2100 based on the determination (operation [3]).

The host 2100 may provide a circumstance suitable for the maintenance operation based on the notification NTF. In the provided circumstance, the storage device 2301 may control the storage device 2303 such that the maintenance operation is performed (operation [4]). In response to the control, the maintenance operation may be performed one selected ones or all of the storage devices 2301, 2302, 2303, and 2304 (operation [5]).

For example, as the storage devices 2301, 2302, 2303, and 2304 communicate with one another, the maintenance operation may be performed such that data stored in the storage device 2303 migrates to the storage devices 2301, 2302, and 2304. Data reliability may be guaranteed as the maintenance operation is performed.

For example, when the electronic system 2000 is a server, after the maintenance operation is completed, the storage device 2301 and/or the storage device 2303 may notify the host 2100 or a server manager person that replacement of the storage device 2303 is required. For example, the storage device 2303 may provide a replacement notification by flickering of a lamp, output of an alarm sound, etc.

Figure 20:
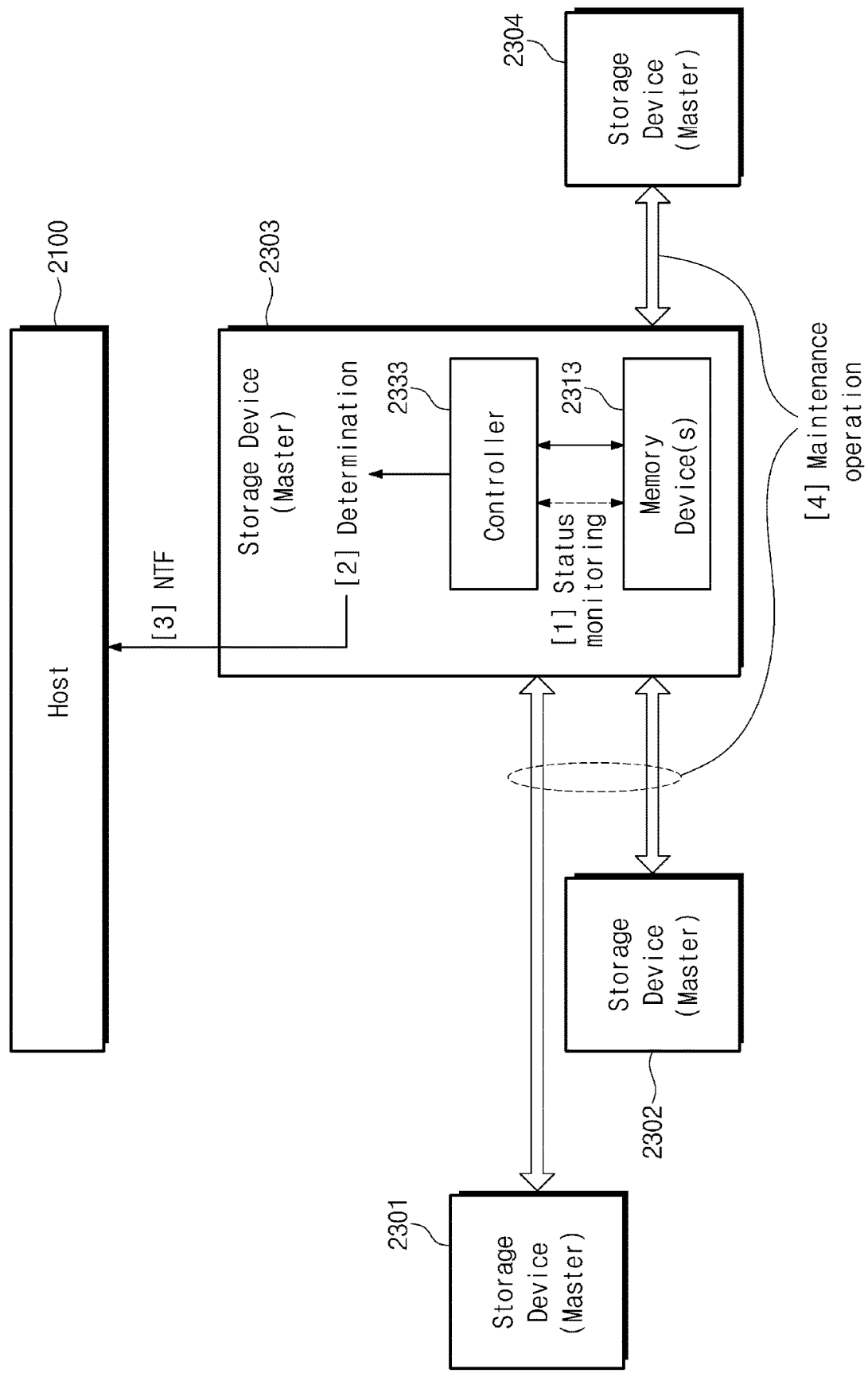

FIG. 20 is a conceptual diagram for describing an example operation of the storage devices 2301, 2302, 2303, and 2304 of FIG. 18.

For example, all the storage devices 2301, 2302, 2303, and 2304 may be configured and operate to be substantially identical or similar to the storage device 1300. Each of the storage devices 2301, 2302, 2303, and 2304 may act as a master device such that the maintenance operation is performed among the storage devices 2301, 2302, 2303, and 2304 without intervention of the host 2100.

The storage devices 2301, 2302, 2303, and 2304 may monitor a status associated with the memory devices 2311, 2312, 2313, and 2314 of the storage devices 2301, 2302, 2303, and 2304 without intervention of the host 2100. The storage devices 2301, 2302, 2303, and 2304 may mutually share information of the monitored status, and may perform the maintenance operation actively based on the shared information.

For example, the storage device 2303 may monitor a status associated with the memory device 2313 without intervention of the host 2100 (operation [1]). For example, as the storage device 2303 becomes deteriorated, the status associated with the memory device 2313 may satisfy the maintenance condition. The storage device 2303 may determine the maintenance condition (operation [2]), and may output the notification NTF to the host 2100 based on the determination (operation [3]).

The host 2100 may provide a circumstance suitable for the maintenance operation based on the notification NTF. In the provided circumstance, as the storage device 2303 communicates with the storage devices 2301, 2302, and 2304, the maintenance operation may be performed among the storage devices 2301, 2302, 2303, and 2304 (operation [4]). For example, the maintenance operation may be performed such that data stored in the storage device 2303 migrates to the storage devices 2301, 2302, and 2304.

The above descriptions are intended to provide example configurations and operations. The present invention may include implementations which may be obtained by simply changing or modifying the above example embodiments, in addition to the above-described example embodiments. For example, example embodiments described herein show working memory 1200 and power manager 1600 as being separate from storage device 1300. However, one or both of working memory 1200 and power manager 1600 may be duplicated and/or made part of storage device 1300 (e.g., formed on a substrate, such as a printed circuit board of the storage device 1300 on which controller 1300 and memory devices 1310 are also formed). For example, memory 1200 that may be formed as part of the storage device 1300 may be a cache memory for the storage device 1300 (e.g., volatile memory, such as DRAM or SRAM, that has faster access times as compared to non-volatile memory devices 1310 to quickly store received data prior to storage of the same in the non-volatile memory devices 1310). As another example, other modes of operation of the storage device 1300 may be implemented to reduce power consumption in which devices are not fully turned off, such as putting memory devices 1310 into sleep mode in which the memory devices 1310 receive power but have certain portions of the memory devices 1310 turned off (such as a DLL circuit or PLL circuit of the memory devices which operate to establish synchronous communications with controller 1330). Controller 1330 may similarly be configured to operate in such a sleep mode. Also, the present invention may include implementations which may be accomplished by changing or modifying the above-described example embodiments with devices and components that are later developed.

What is claimed is:

1. A solid state storage device comprising:
an interface to provide communication with a host;
a plurality of nonvolatile memory devices; and
a controller configured to be in communication with the nonvolatile memory devices to access the nonvolatile memory devices and configured to be in communication with the interface to receive commands from the host and communicate data with the host,
wherein the controller comprises a status manager, the status manager being configured to cause a maintenance notification to be sent to the host in response to determining that one or more of the nonvolatile memory devices require maintenance to cause the host to provide information to the controller that identifies a period of time in which the host is not scheduled to access the solid state storage device and during which the controller may perform one or more maintenance operations on the one or more nonvolatile devices determined to require maintenance, and
wherein the controller is responsive to the information provided by the host to perform the one or more maintenance operations during the identified period of time.

2. The solid state storage device of claim 1, wherein the maintenance notification is a WAKE# command according to peripheral component interconnect express (PCIe) protocol.

3. The solid state storage device of claim 1, wherein the controller determines the period of time in which to perform the one or more maintenance operations based upon the information received from the host.

4. The solid state storage device of claim 3,
wherein the information received by the controller identifies an idle time of the host, and
wherein the controller is responsive to the information to perform a read reclaim operation on the one or more of the nonvolatile memory devices during the identified idle time, the read reclaim operation comprising reading data from a first page of memory cells of the one or more of the plurality of nonvolatile memory devices to a first page buffer of the one or more of the plurality of nonvolatile memory devices and subsequently writing the data of the first page buffer to the first page of memory cells.

5. The solid state storage device of claim 1, wherein the status manager is configured to cause the maintenance notification to be sent to the host in response to determining that the one or more of the nonvolatile memory devices have wear levels that have reached a threshold.

6. The solid state storage device of claim 1, wherein the status manager is configured to cause the maintenance notification to be sent to the host in response to determining that invalid memory regions of the nonvolatile memory devices have reached a threshold, the invalid memory regions being memory regions containing old data that is no longer valid.

7. The solid state storage device of claim 1, wherein the status manager is configured to cause the maintenance notification to be sent to the host in response to determining that an available capacity of the nonvolatile memory devices has reached a threshold, the available capacity of the nonvolatile memory devices denoting a size of memory of the nonvolatile memory devices that is currently available for writing data.

8. The solid state storage device of claim 1, wherein the controller is configured to perform a read reclaim operation on the one or more of the plurality of nonvolatile memory devices during the period of time, the read reclaim operation comprising reading data from a first page of memory cells of the one or more of the plurality of nonvolatile memory devices to a first page buffer of the one or more of the plurality of nonvolatile memory devices and subsequently writing the data of the first page buffer to the first page of memory cells.

9. The solid state storage device of claim 1,
wherein the status manager is configured to monitor an attribute of memory regions of the plurality of nonvolatile memory devices, the monitored attribute comprising at least one of:
a wear level of each of the memory regions,
an amount of invalid memory regions,
an available capacity of the memory regions,
a lifespan of each of the memory regions, and
a reliability of data storage of each of the memory regions, and
wherein the status manager is configured cause the maintenance notification to be sent to the host in response to a comparison of the monitored attribute to a threshold.

10. A storage device comprising:
a plurality of nonvolatile memory devices;
a controller connected to the plurality of nonvolatile memory devices; and
a timer configured to be initiated upon the controller entering a power saving mode and output a first signal upon expiration of a reference time after initiation of the timer,
wherein the controller is configured to send a maintenance notification to an external host in response to the first signal of the timer, and to perform one or more maintenance operations on one or more nonvolatile devices during a period of time in which the storage device is not scheduled for access by the external host.

11. The storage device of claim 10,
wherein the storage device is operable in a normal mode in which the plurality of nonvolatile memory devices are turned on and the controller operates at a normal power consumption level, and
wherein the storage device is operable in the power saving mode in which the plurality of nonvolatile memory devices are turned off and the controller operates at a reduced power level.

12. The storage device of claim 10, wherein the storage device is configured to exit the power saving mode in response to the start of receiving main power from the external host during the power saving mode.

13. The storage device of claim 12, wherein the controller is configured to perform a maintenance operation on the plurality of nonvolatile memory devices upon the exiting of the power saving mode in response to the start of receiving main power from the external host.

14. The storage device of claim 13, the controller is configured to put the storage device back into the power saving mode from the normal mode in response to completion of the maintenance operation.

15. The storage device of claim 12, wherein upon the storage device exiting the power saving mode, the controller is configured to perform a read reclaim operation automatically without instructions from the external host, the read reclaim operation comprising reading data from a first page of memory cells of the one or more of the plurality of nonvolatile memory devices to a first page buffer of the one or more of the plurality of nonvolatile memory devices and subsequently writing the data of the first page buffer to the first page of memory cells.

16. The storage device of claim 10, wherein the maintenance notification is a WAKE# command according to peripheral component interconnect express (PCIe) protocol.

17. A electronic system comprising:
a host;
a power manager to selectively provide main power and auxiliary power; and
a storage device connected to the host and connected to the power manager to receive the main power and auxiliary power provided by the power manager,
wherein the storage device comprises:
a plurality of nonvolatile memory devices; and
a controller connected to the nonvolatile memory devices,
wherein the storage device is configured to operate in a first mode and in a second mode,
wherein, in the first mode the power manager provides the main power to the storage device and in the second mode the power manager provides the auxiliary power to the storage device,
wherein the controller is configured to monitor an attribute of memory regions of the plurality of nonvolatile memory devices, and to send a notification of to the host in response to determining that an initiation condition is satisfied by comparing the monitored attribute to a threshold in the second mode, and
wherein the host is configured to control the power manager to switch from providing the auxiliary power to providing the main power to the storage device in response to the notification.

18. The electronic system of claim 17, wherein the notification is a WAKE# command according to peripheral component interconnect express (PCIe) protocol.

19. The electronic system of claim 17, wherein the monitored attribute comprises at least one of:
a wear level of each of the memory regions,
an amount of invalid memory regions,
an available capacity of the memory regions,
a lifespan of each of the memory regions, and
a reliability of data storage of each of the memory regions.

20. The electronic system of claim 17,
wherein the storage device is configured to exit the second mode in response to an initiation of receiving a main power from the power manager, and
wherein the controller is configured to perform a maintenance operation on the plurality of nonvolatile memory devices upon the exiting of the second mode.

* * * * *